United States Patent
Hurst et al.

(10) Patent No.: US 8,176,561 B1
(45) Date of Patent: May 8, 2012

(54) ASSESSING NETWORK SECURITY RISK USING BEST PRACTICES

(75) Inventors: David Hurst, Chicago, IL (US); Sowmitri Swamy, Lisle, IL (US); Chandrasekhara Reddy, Aurora, IL (US); Anjali Gurnani, Chicago, IL (US)

(73) Assignee: Athena Security, Inc., Lombard, IL (US)

( * ) Notice: Subject to any disclaimer, the term of this patent is extended or adjusted under 35 U.S.C. 154(b) by 507 days.

(21) Appl. No.: 12/424,316

(22) Filed: Apr. 15, 2009

Related U.S. Application Data

(63) Continuation-in-part of application No. 11/639,875, filed on Dec. 14, 2006, now Pat. No. 7,849,497.

(60) Provisional application No. 61/045,162, filed on Apr. 15, 2008.

(51) Int. Cl.
*G06F 11/00* (2006.01)
(52) U.S. Cl. ............................. 726/25; 726/1
(58) Field of Classification Search .................. 726/25, 726/1, 11, 14; 716/11, 14
See application file for complete search history.

(56) References Cited

U.S. PATENT DOCUMENTS

| | | | |
|---|---|---|---|
| 6,990,513 B2 | 1/2006 | Belfiore et al. | |
| 7,003,562 B2 | 2/2006 | Mayer | |
| 7,137,145 B2 * | 11/2006 | Gleichauf | 726/24 |
| 7,231,668 B2 * | 6/2007 | Jacobson | 726/26 |
| 7,310,669 B2 * | 12/2007 | Webb et al. | 709/224 |
| 7,389,347 B2 * | 6/2008 | Brodie et al. | 709/224 |
| 7,415,728 B2 * | 8/2008 | Morohashi et al. | 726/25 |
| 7,647,622 B1 * | 1/2010 | Sobel et al. | 726/1 |
| 7,886,350 B2 * | 2/2011 | Ormazabal | 726/11 |
| 7,975,286 B1 * | 7/2011 | Fickey et al. | 726/1 |
| 2002/0021675 A1 | 2/2002 | Feldmann | |
| 2002/0093527 A1 | 7/2002 | Sherlock et al. | |
| 2003/0188189 A1 * | 10/2003 | Desai et al. | 713/201 |
| 2004/0019807 A1 | 1/2004 | Freund | |
| 2004/0064727 A1 | 4/2004 | Yadav | |
| 2004/0215978 A1 | 10/2004 | Okajo | |
| 2008/0047016 A1 * | 2/2008 | Spoonamore | 726/25 |

OTHER PUBLICATIONS

Al-Shaer et al., "Firewall Policy Advisor for Anomaly Detection, Rules Editing and Translation," IEEE/IFIP Integrated Management IM'2003 (2003).

Al-Shaer et al., "Management and Translation of Filtering Security Policies," IEEE International Conference on Communications (May 2003).

Al-Shaer et al., "Discovery of Policy Anomalies in Distributed Firewalls," IEEE INFOCOM'04, pp. 2605-2616 (Mar. 2004).

(Continued)

*Primary Examiner* — Samson Lemma
(74) *Attorney, Agent, or Firm* — Drinker Biddle & Reath LLP

(57) ABSTRACT

A method and appertaining system for implementing the method are provided that utilize predefined Best Practice Templates that are rules/criteria for assessing the security of a particular network and devices on the network. A value is determined for each object and connection within a network as to whether it passes or fails one of the Best Practice criteria, and a pass ratio is determined for a particular Best Practice. Numerous Best Practice tests may be run, and an overall total value based on the collective sum of the Best Practice measurements is determined. This value can be utilized to provide a user with information that relates to the overall security of a network and can be used in compliance determinations and network architecture design.

20 Claims, 27 Drawing Sheets

OTHER PUBLICATIONS

Al-Shaer et al., "Modeling and Management of Firewall Policies," IEEE Transactions on Network and Service Management, 1(1) (Apr. 2004).

Al-Shaer et al., "Conflict Classification and Analysis of Distributed Firewall Policies," IEEE Journal on Selected Areas in Communications (JSAC), 23(10), pp. 2069-2084 (2005).

Bartal et al., "*Firmato*: A Novel Firewall Management Toolkit," Technical Report EES2003-1, Dept. of Electrical Engineering Systems, Tel Aviv University (2003).

Bellovin, "Distributed Firewalls," ;*login:*, pp. 37-39 (Nov. 1999).

Eppstein et al., "Internet Packet Filter Management and Rectangle Geometry," Symp. on Discrete Algorithms, pp. 827-835 (2001).

Eronen et al., "An Expert System for Analyzing Firewall Rules," Proc. of the 6th Nordic Workshop on Secure IT Systems (NordSec 2001), pp. 100-107 (2001).

Hamed et al., "Taxonomy of Conflicts in Network Security Policies," IEEE Communications Magazine, 44(3) (Mar. 2006).

Hazelhurst et al., "Binary Decision Diagram Representations of Firewall and Router Access Lists," Technical Report TR-Wits-CS-1998-3, University of the Witwatersrand, Johannesburg, South Africa (Oct. 1998).

Hazelhurst et al., "Algorithms for Analyzing Firewall and Router Access Lists," Proc. of the International Conference on Dependable Systems and Networks (DSN'00), pp. 576-585 (2000).

Liu et al., "Firewall Queries," Proceedings of the 8th International Conference on Principles of Distributed Systems, LNCS 3544, T. Higashino Ed., Springer-Verlag, pp. 124-139 (Dec. 2004).

Mayer et al., "Fang: A Firewall Analysis Engine," Proc. of IEEE Symp. on Security and Privacy, pp. 177-187 (2000).

Schuba et al., "A Reference Model for Firewall Technology," SPARTAN Symposium (Mar. 1997).

Wool, "A Quantitative Study of Firewall Configuration Errors," IEEE Computer, 37(6) pp. 62-67 (Jun. 2004).

Wool, "Architecting the Lumeta Firewall Analyzer," Proceedings of the $10^{th}$ USENIX Security Symposium, Washington, D.C. (Aug. 2001).

Xie, et al. "On Static Reachability Analysis of IP Networks," Proceedings of IEEE Infocom'05 (Mar. 2005).

Yuan et al., "Fireman: A Toolkit for Firewall Modeling and Analysis," Proceedings of 2006 IEEE Symposium on Security and Privacy, Oakland, CA, (May 2006).

\* cited by examiner

```
⊟ [Action] ALLOW
    ⊟ [Protocol] tcp
        ⊟ [SrcAddress] 10.20.5.0/24
            ⊟ [SrcPort] (1024, 65535)
                ⊟ [DstAddress] 216.27.61.68
                    [DstPort] pop3
                ⊟ [DstAddress] 216.27.61.67
                    [DstPort] 8080
                    [DstPort] https
                    [DstPort] http
                ⊟ [DstAddress] 216.27.61.69
                    [DstPort] http
            ⊟ [SrcPort] (1, 65535)
                ⊟ [DstAddress] 192.168.102.51
                    [DstPort] 995
                    [DstPort] 993
                    [DstPort] imap4
                    [DstPort] pop3
                    [DstPort] smtp
                ⊟ [DstAddress] 192.168.102.52
                    [DstPort] http
                ⊟ [DstAddress] 192.168.102.50
                    [DstPort] 8080
                    [DstPort] https
                    [DstPort] http
⊞ [Action] DENY
```

FIG. 10

```
[Action] ALLOW
    [Protocol] tcp
        [DstPort] pop3
            [DstAddress] 216.27.61.68
            [DstAddress] 192.168.102.51
        [DstPort] 8080
            [DstAddress] 216.27.61.67
            [DstAddress] 192.168.102.50
        [DstPort] https
            [DstAddress] 216.27.61.67
            [DstAddress] 192.168.102.50
        [DstPort] http
            [DstAddress] 216.27.61.67
            [DstAddress] 216.27.61.69
            [DstAddress] 192.168.102.52
            [DstAddress] 192.168.102.50
        [DstPort] 995
            [DstAddress] 192.168.102.51
        [DstPort] 993
            [DstAddress] 192.168.102.51
        [DstPort] imap4
            [DstAddress] 192.168.102.51
        [DstPort] smtp
            [DstAddress] 192.168.102.51
[Action] DENY
```

FIG. 11

Best Practice Calculation

Example Best Practice Evaluation:
Isolate Internet Servers in a DMZ

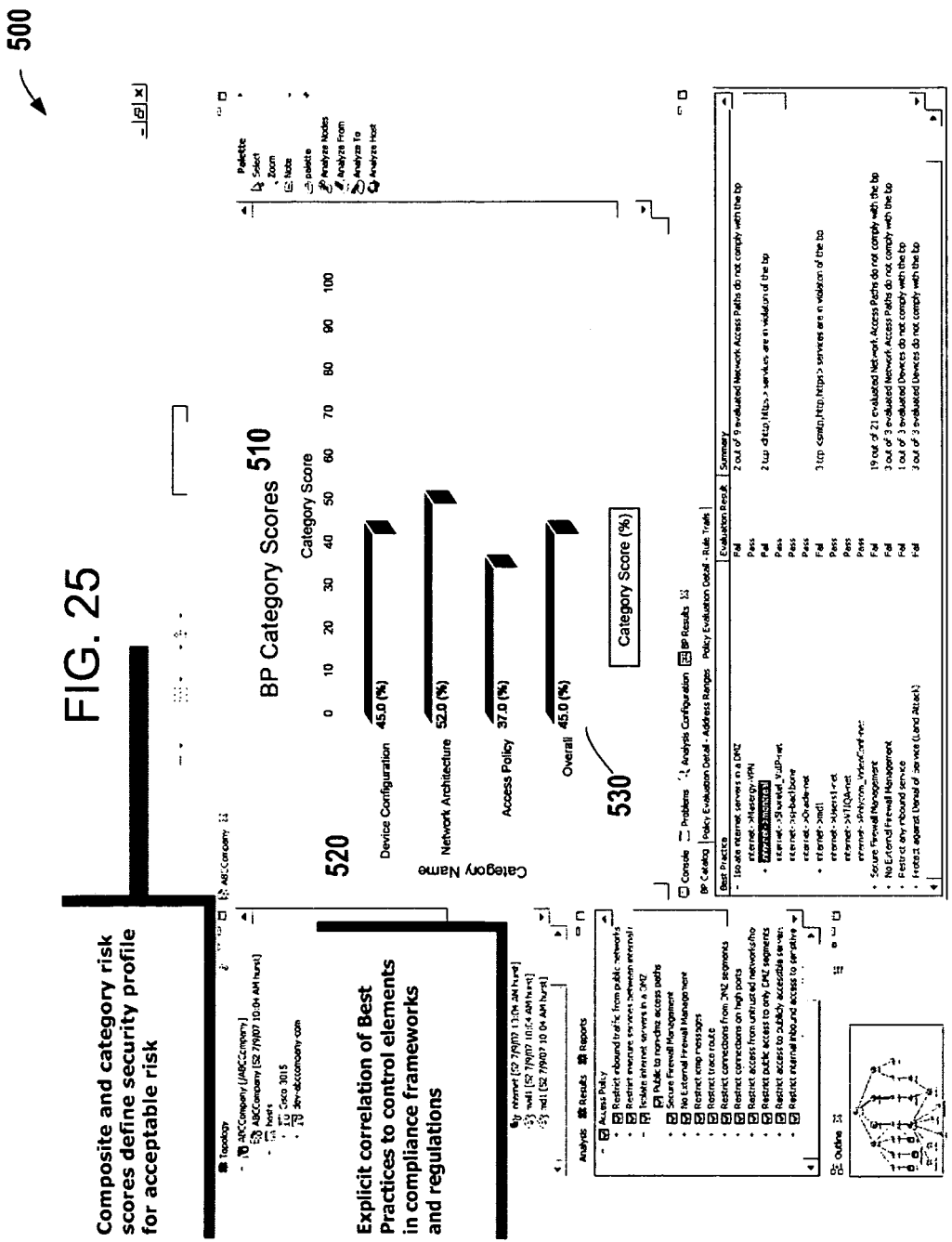

ASSESSING NETWORK SECURITY RISK USING BEST PRACTICES

CROSS REFERENCE TO RELATED APPLICATIONS

The present application claims the benefit of U.S. Provisional Patent Application No. 61/045,162, filed Apr. 15, 2008, entitled, "Assessing Network Security using Best Practices", and is a continuation-in-part of U.S. patent application Ser. No. 11/639,875, filed Dec. 14, 2006, entitled, "Method and System for Analyzing the Security of a Network", both herein incorporated by reference.

BACKGROUND

The present invention relates to a method and appertaining system for assessing the security risk of a computer network that measures the deviation in network's architecture, access policies, and device configurations based on a set of "Best Practice Templates" (BPTs) that collectively constitute "good security" in the network infrastructure.

In addition to the protection of other important network devices, firewalls are a mainstay of corporate network security. These network devices enforce a security policy on the communication traffic entering or leaving one or more defined network zones. A well-designed security policy will provide access to internal networks for authorized sources while preventing unauthorized access to sensitive data assets. Ensuring that a firewall properly implements the desired security policy is essential to maintaining the security of the protected network zones.

Articulating a firewall policy as part of a firewall assessment, audit or hardening exercise turns out to be difficult, and calculating it may require deep analysis. Simple inspection of the firewall rules is not sufficient to determine whether or not the security policy implemented by the firewall complies with the requirements in a checklist. The mere presence in the ruleset of a rule denying an insecure network service like NetBIOS does not ensure that the service is truly blocked from reaching a critical server.

SUMMARY

Accordingly, a method is provided for assessing network security in a network topology using best practice templates (BPTs), comprising: providing a BPT catalog comprising a plurality of BPTs, wherein each BPT comprises a best practice (BP) that comprises an identification predicate returning identification results over a network related object set having one or more objects and object values, and an evaluation predicate returning a Boolean result of TRUE or FALSE or that can be evaluated to PASS or FAIL; identifying one or more targets for the assessment using the BP; for each target, evaluating compliance of the target using evaluation criteria that are a part of the BP evaluation predicate as PASS or FAIL; determining a composite compliance result across all targets as being PASS if all targets evaluated to PASS; and displaying or storing the compliance result.

Additionally, a corresponding system for performing the method is provided, comprising: a processor; a memory for storing algorithms that execute on the processor; a BPT catalog residing on a storage element of the system comprising a plurality of BPTs, wherein each BPT comprises a best practice (BP) that comprises an identification predicate returning identification results over a network related object set having one or more objects and object values, and an evaluation predicate returning a Boolean result of TRUE or FALSE or that can be evaluated to PASS or FAIL; an algorithm for identifying one or more targets for the assessment using the BP, and that, for each target, evaluates compliance of the target using evaluation criteria that are a part of the BP evaluation predicate as PASS or FAIL; an algorithm for determining a composite compliance result across all targets as being PASS if all targets evaluated to PASS; and at least one of a user interface for displaying the composite compliance result, and a data storage for storing the composite compliance result.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain features according to various embodiments of the invention.

FIGS. 10 & 11 are structured text listings illustrating textual views of a policy tree according to an embodiment of the invention;

FIG. 25 is an example display showing a result of the calculations.

DETAILED DESCRIPTION

In the system, there is a device adapter associated with each device that has a significant impact on the security of the network (e.g., routers, switches, gateways, or "significant hosts"). The device adapter, which may be implemented as a piece of software executing remotely from the device, queries the device to determine what its security settings are (e.g., its firewall rules). The device adapter conducts the query using whichever form of communication the device requires (e.g., telnet, HTTP) and using whichever command set the device requires.

Each type of device on the network has a software model associated with it. For example, there may be a router model, a switch model, a firewall model, and a gateway model. The model is made up of a series of rule sets. Each rule set includes rules that are derived from the configuration of the device (obtained by the device adapter). The rules are expressed in a canonical rule set language.

In one embodiment, the rule sets include matching criteria/action rules, filtering action rules, routing rules, transform rules, and control action rules. Using the devices models, a security analysis program determines the effective security policy that is in effect between two or more nodes of the network (e.g., 1-to-1, 1-to-n, n-to-1, or n-to-n nodes). The security analysis program can then display this policy to a user on a graphical user interface in the form of a policy tree. The policy tree is arranged hierarchically, but can be reordered according to the user's preference. This enables the user to view the policy according to the criteria that are the most meaningful to the user. The security analysis program can track changes in the effective security policy, thereby enabling the user to see what impact changes in the network, or changes in the security settings of devices on the network have on security.

Figure 1:
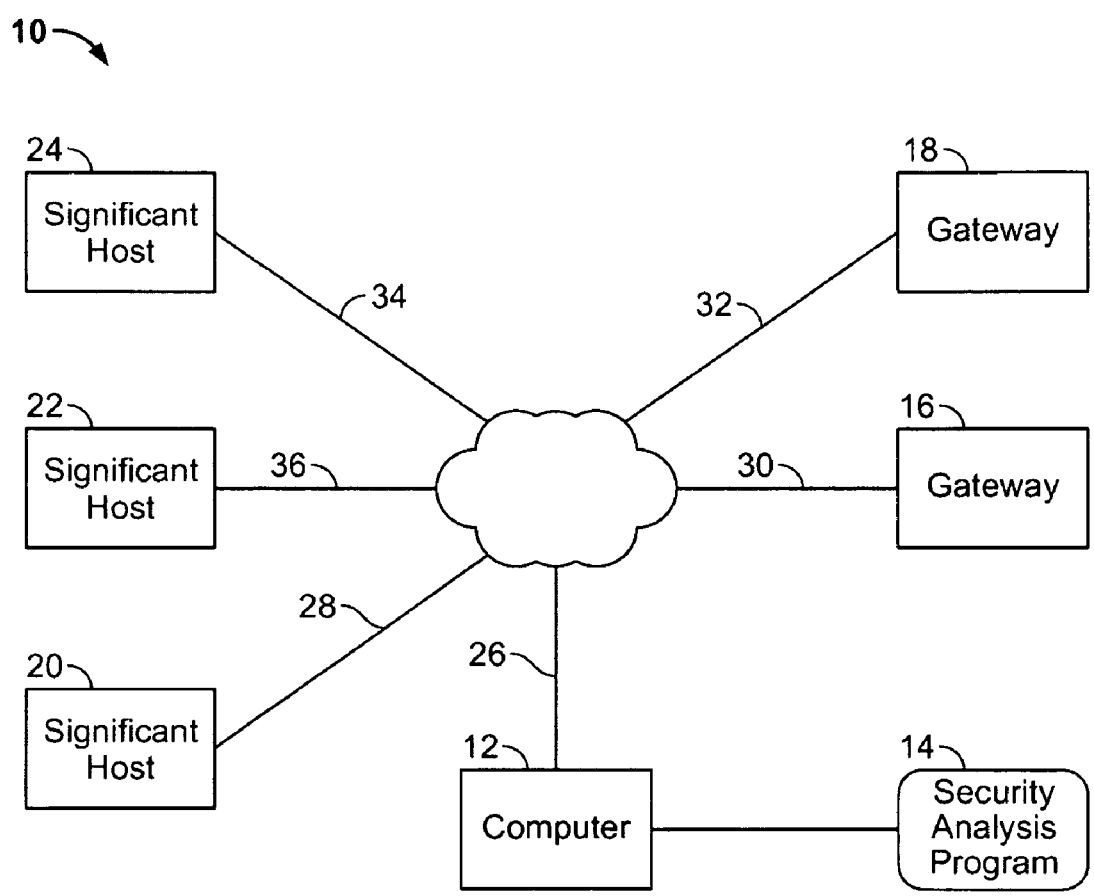
FIG. 1 is a block diagram illustrating a computer network configured according to an embodiment of the invention.

Referring to FIG. 1, an example computer network on which an embodiment of the invention is deployed will now be described. The computer network, generally labeled 10, includes a computer 12 on which security analysis program 14 executes. The computer network 10 also includes first and second gateways 16 and 18, and three "significant hosts" 20, 22 and 24. As used herein, the term "significant host" means any host that stores valuable information assets or executes software that is critical to the operation of the business of the entity that uses the network 10 (including commercial, public/governmental, or non-profit entities). The computer network 10 also includes several segments 26, 28, 30, 32 and 34. Each segment is a communications pathway that may be wired (such as an Ethernet cable) or wireless.

Figure 2:
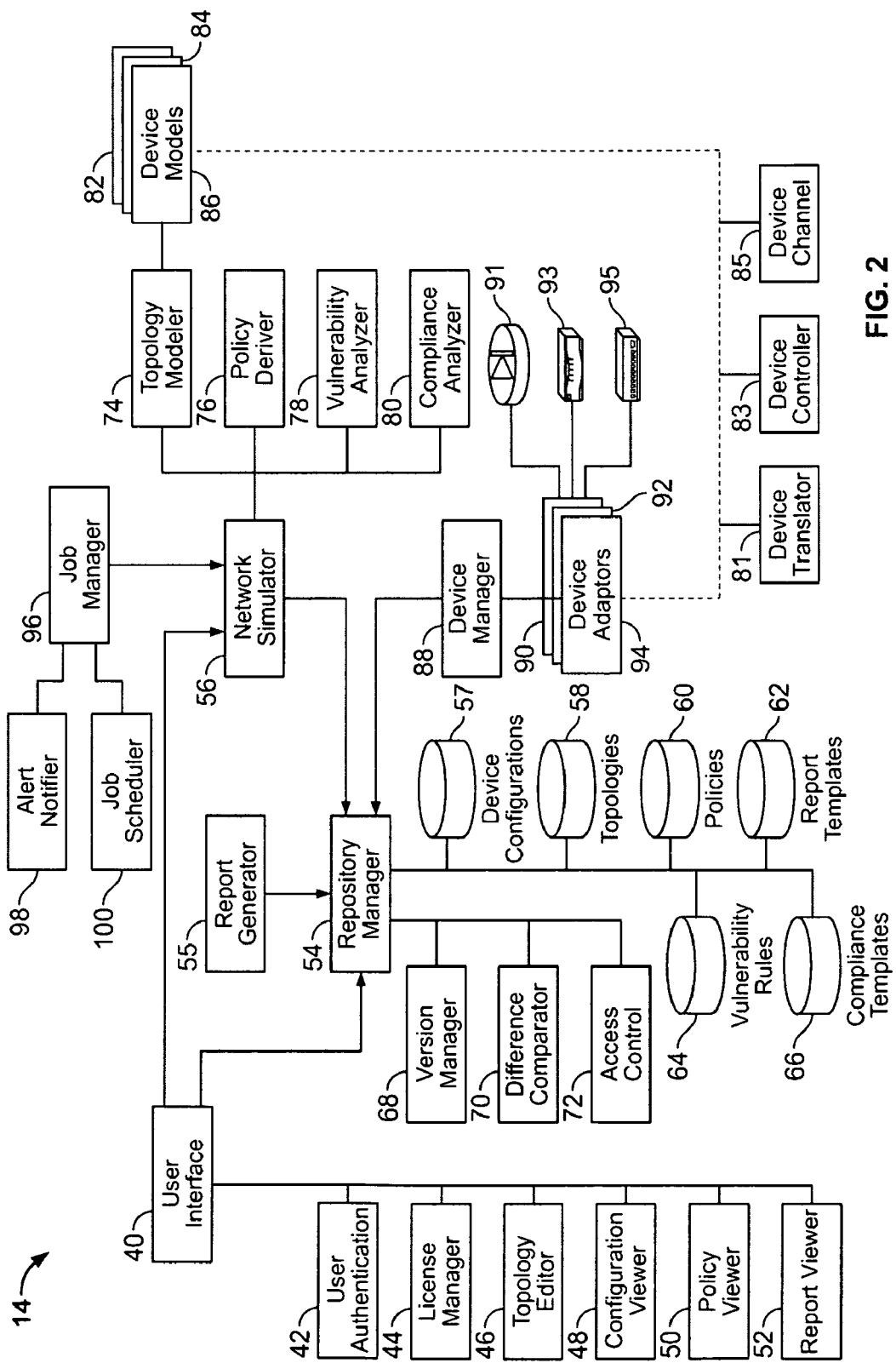
FIG. 2 is a block diagram illustrating the architecture of a security analysis program in accordance with an embodiment of the invention.

Referring to FIG. 2, the architecture for the security analysis program 14 (from FIG. 1) for an embodiment of the invention will now be described. The module with which the user interacts most directly is a user interface module 40. The user interface module 40 includes a user authentication module 42, a license manager 44, a topology editor 46, a configuration viewer 48, a policy viewer 50, and a report viewer 52. The user authentication module 42 authenticates the user through a logon process. The license manager determines whether or not the system upon which the security analysis program 14 executes has a valid license to execute the security analysis program 14. The topology editor 46 permits the user to edit a network topology. The configuration viewer 48 displays the configuration files of various devices on the network 10 in response to input from the user. Similarly, the policy viewer 50 displays the policy or policies generated by the security analysis program 14 based on the configuration settings of various devices on the network 10. The report viewer 52 displays reports that contain information about the security of the network 10. The user interface module 40 interacts with a repository manager 54 and a network simulator 56.

The repository manager 54 stores and retrieves data from one of several databases. These databases include a device configurations database 57, a topologies database 58, a policies database 60, a report templates database 62, a vulnerability rules database 64, and a compliance database 66. The device configurations database 57 contains information regarding the security configuration of various devices in the network 10 (FIG. 1). The topologies database 58 contains data regarding the current topology of the network 10 as well as information regarding past topologies of the network 10. The policies database 60 contains data regarding the security policy of each of the gateways and significant hosts of the network 10. The report templates database 62 contains data regarding the format and content of various reports that the security analysis program generates. The vulnerability rules database 64 contains data regarding criteria by which the security analysis program 14 determines whether the network 10 or portion thereof has a security vulnerability. The repository manager 54 includes a version manager 68, a difference comparator 70, and an access control module 72. The version manager 68 keeps track of different versions of topologies and policies that are stored in the topology database 58 and the policies database 60. The difference comparator 70 compares different versions of topologies and policies that are stored in the topology database 58 and the policies database 60 to permit a user to see a "marked-up" version and to quickly determine what changes were made among different versions. The access control module 72 regulates access to the various databases. A report generator 55 generates reports and sends them to the repository manager 54. Possible reports generated include a report on the policy from external networks, policy to the Internet, policy between internal subnets or geographic locations, implementation of "best practices" in network security policy, security risk profile, and regulatory compliance.

There are many possible ways that the topology information contained in the topologies database 58 can be generated. In one embodiment, the topology is created through a manual process, in which the user identifies all of the network segments and devices that will be used in the topology. The user also creates a network or host definition for each element of the topology. The user then places each network or device on the topology diagram. The user may carry out these tasks via the user interface module 40. The security analysis program 14 then determines the nature of the connections between networks and devices based in part on the network address ranges of the networks and the Internet Protocol (IP) addresses of the network interfaces associated with the devices. In another embodiment, the security analysis program 14 automatically discovers the topology using a conventional topology discovery tool and various network management tools.

The network simulator 56 simulates the network 10 (FIG. 1) using device models. The network simulator 56 includes a topology modeler 74, a policy deriver 76, a vulnerability analyzer 78, and a compliance analyzer 80. The topology modeler 74 models the topology of the network 10 using a set of device models 82, 84 and 86, each of which are built based on a series of rule sets written using a canonical ruleset language. The canonical ruleset language provides a common, device-independent representation of the security devices being modeled. The policy deriver 76 derives the policy or policies that are effectively in place for the various portions of the network 10. In an embodiment of the invention, the policy deriver 76 expresses the policies in terms of the protocol, source address, source port, destination address and destination port of the network communication (e.g., data packets, data frames, or cells). The vulnerability analyzer 78 analyzes the policy or policies derived by the policy deriver 76 and, using data obtained from the vulnerability rules database 64, determines whether there are any security vulnerabilities in the network 10. The compliance analyzer 80 analyzes the policy or policies derived by the policy deriver 76 and, using data obtained from the policies database 60, determines whether or not the effective policy or policies of the network 10 are in compliance with the actual policy (i.e., the policy that the administrator of the network 10 wishes to implement).

The security analysis program 14 further includes a device manager 88, which interacts with the repository manager 54. In an embodiment of the invention, the device manager 88 uses a plug-in architecture in which each type of device that is being modeled on the network 10 has a corresponding device adapter. As new devices are added or needed, new device adapters can be added. The embodiment of FIG. 2 includes device adaptors 90, 92 and 94. Each device adapter includes a device translator 81 that converts the configuration settings of the device into a canonical ruleset language, a device controller 83 that manages communication with the device, a device channel 85 that provides a mechanism for communicating with the device (e.g., Telnet or SNMP), and a device model that describes important aspects of the behavior of the device. In FIG. 2, three instantiated device models 82, 84 and 86 are shown. Additionally, the device translator 81 has a scripting capability, and the appropriate script is run via the appropriate device channel 85. Each device adapter obtains configuration information for its corresponding device. For example, the first device adapter 90 is associated with a device 91 that acts as a firewall; the second device adaptor 92 is associated with a router 93; and the third device adapter 94 is associated with a switch 95.

Finally, the security analysis program 14 includes a job manager 96, which interacts with the user interface module 40 and the network simulator 56. The job manager 96 includes an alert notifier 98 and a job scheduler 100. In those embodiments where the security analysis program 14 operates as a server in a client-server arrangement, the job manager 96 facilitates the scheduling and execution of unattended analysis processes. The job scheduler 100 schedules the jobs and the alert notifier 98 generates alerts regarding the status of the jobs.

At some point, either before or after the user launches the security analysis program 14, the device adaptors 90, 92 and 94 retrieve configuration information from their respective devices 91, 93 and 95. Examples of configuration information collected include access control rules, authentication rules, and rules for checking the integrity of the data. The device adapter can obtain this sort of data in the form of firewall rules stored in the device with which it is associated. The device adapter uses the interface expected by the device as well as the set of management commands expected by the device. The expected interface and expected management commands may depend on the manufacturer and model of the device. Thus, the device adapters may be configured to handle particular manufacturers and particular models. For example, if the device 93 is a Cisco 870 Series router, then the device adapter 92 would communicate with it using Telnet, Simple Network Management Protocol (SNMP), Command Line Interface (CLI) or Hypertext Transport Protocol (HTTP), and would use a set of management commands that the Cisco 870 Series router recognizes.

Referring to FIG. 2, when the user launches the security analysis program 14, the user interface module 40 requests data regarding the current topology of the network 10 (FIG. 1) from the repository manager 54. The repository manager 54 obtains this data from the topologies database 58. The user interface module 40 also makes a call to the network simulator 56, which provides simulation data for the network 10 to the user interface module 40. The repository manager 54 provides the topology data to the user interface module 40.

Figure 3:
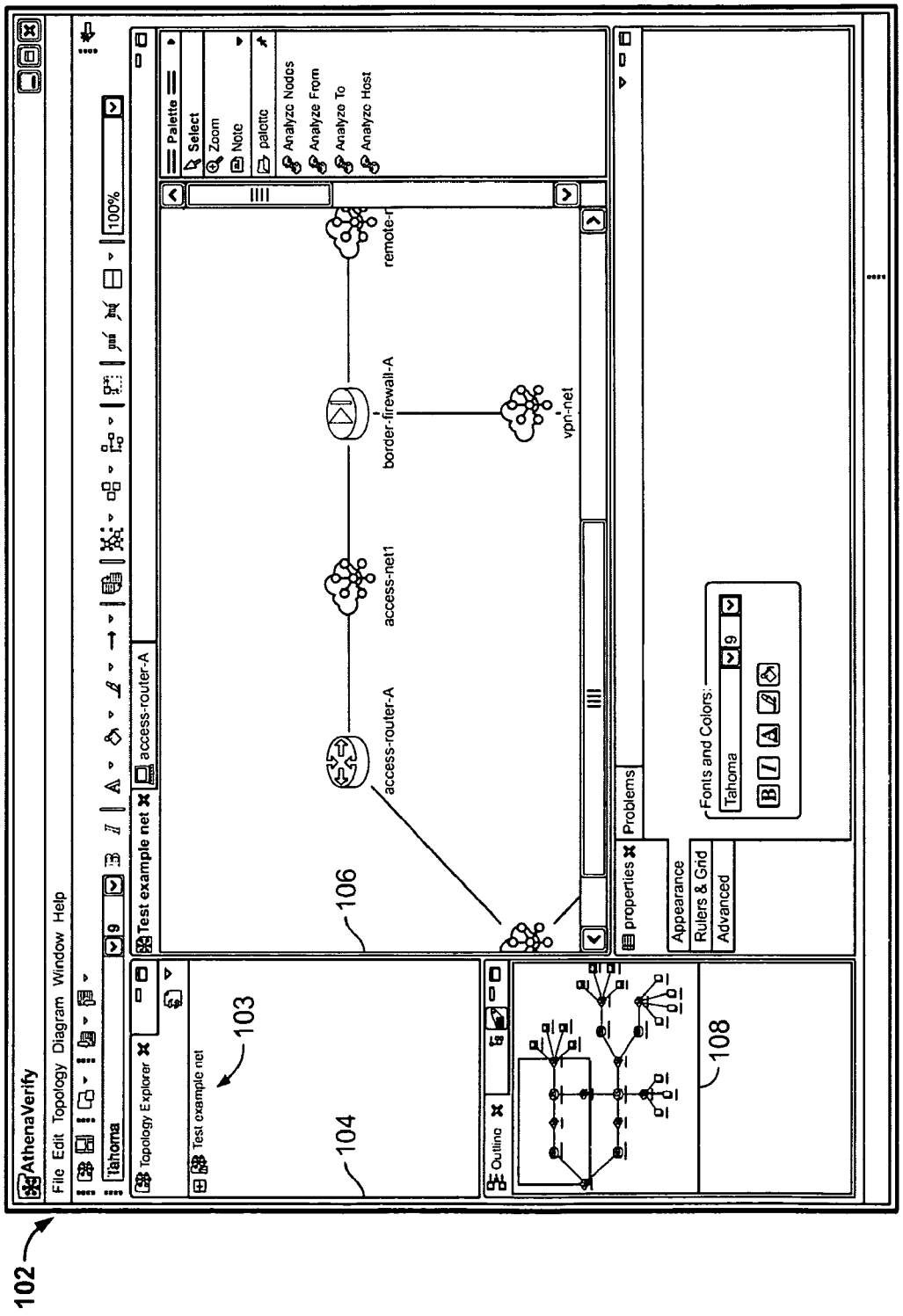
FIGS. 3-8 are computer screen shots illustrating various aspects of a user interface for a security analysis program according to an embodiment of the invention.
Figure 4:
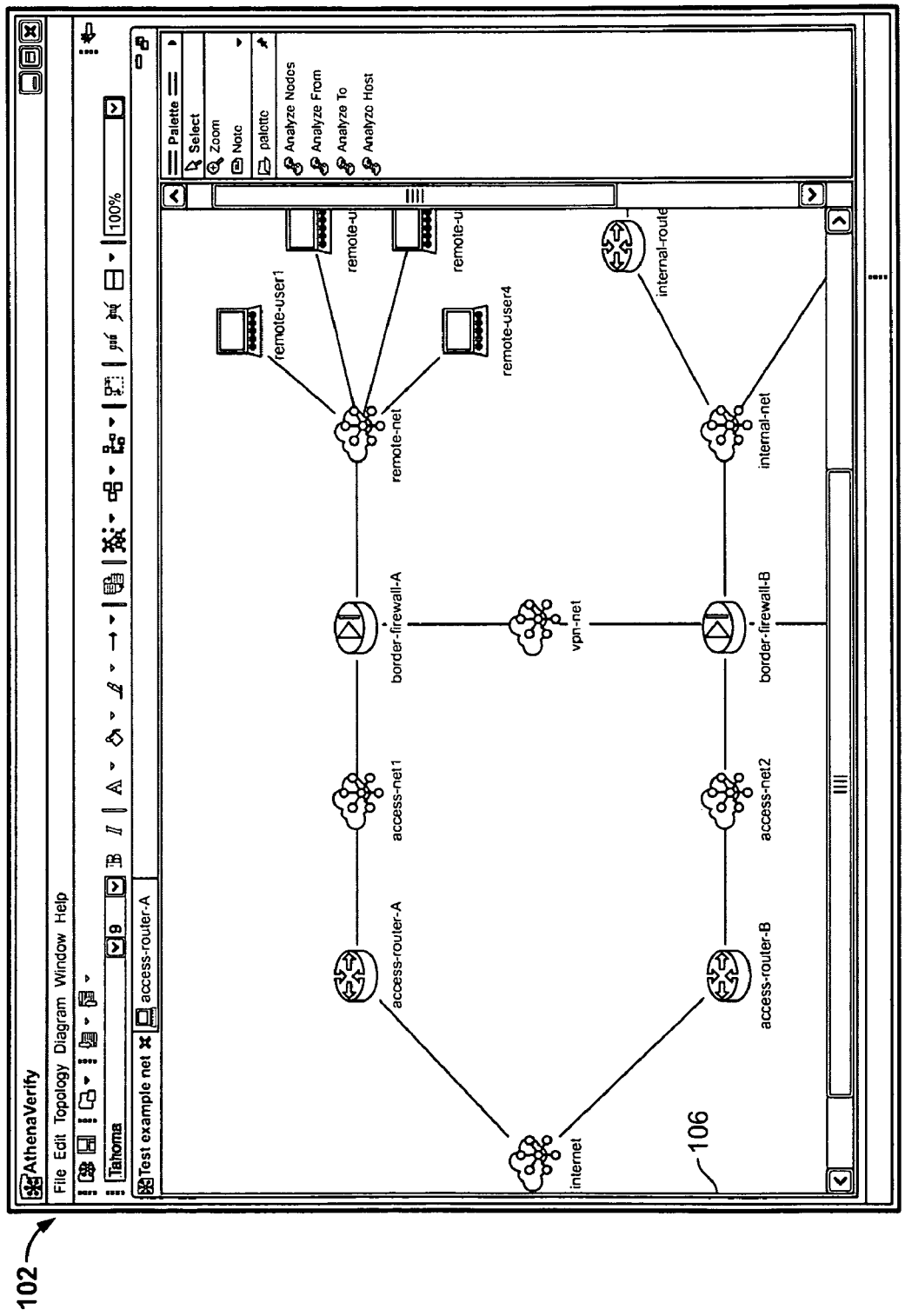

Referring to FIG. 3, a user interface that may be used in an embodiment of the invention will now be described. The user interface, generally labeled 102, displays an expandable tree 103 in a first pane 104. In a second pane 106 of the user interface 102, the security analyzer program 14, displays a diagram of the topology of the network. The user interface 102 also displays a miniature representation of the topology of the network 10 in a third pane 108. Any of the panes of the user interface 102 may be resized. For example, FIG. 4 shows the user interface 102 with the second pane 106 enlarged.

Figure 5:
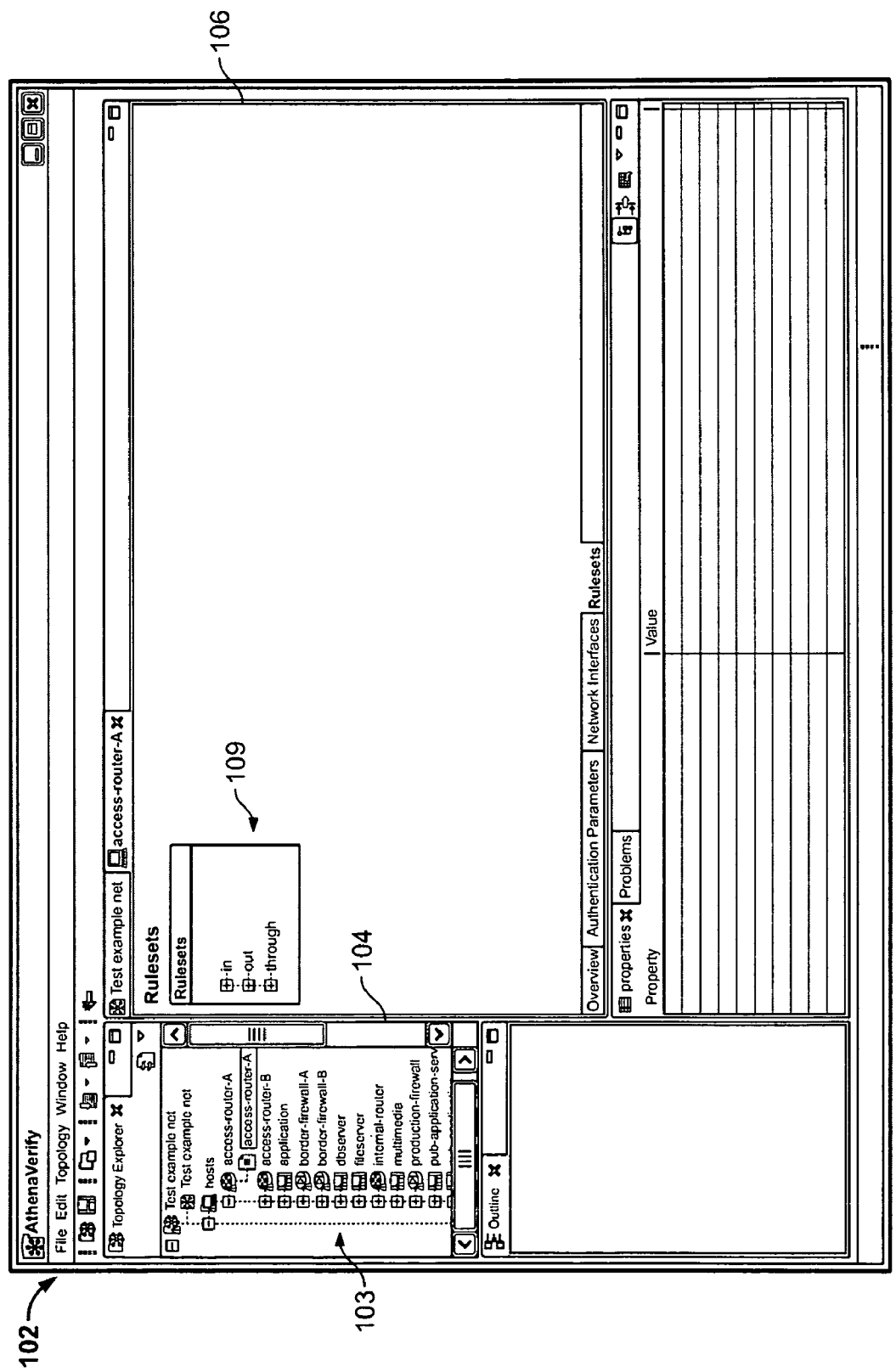
Figure 6:
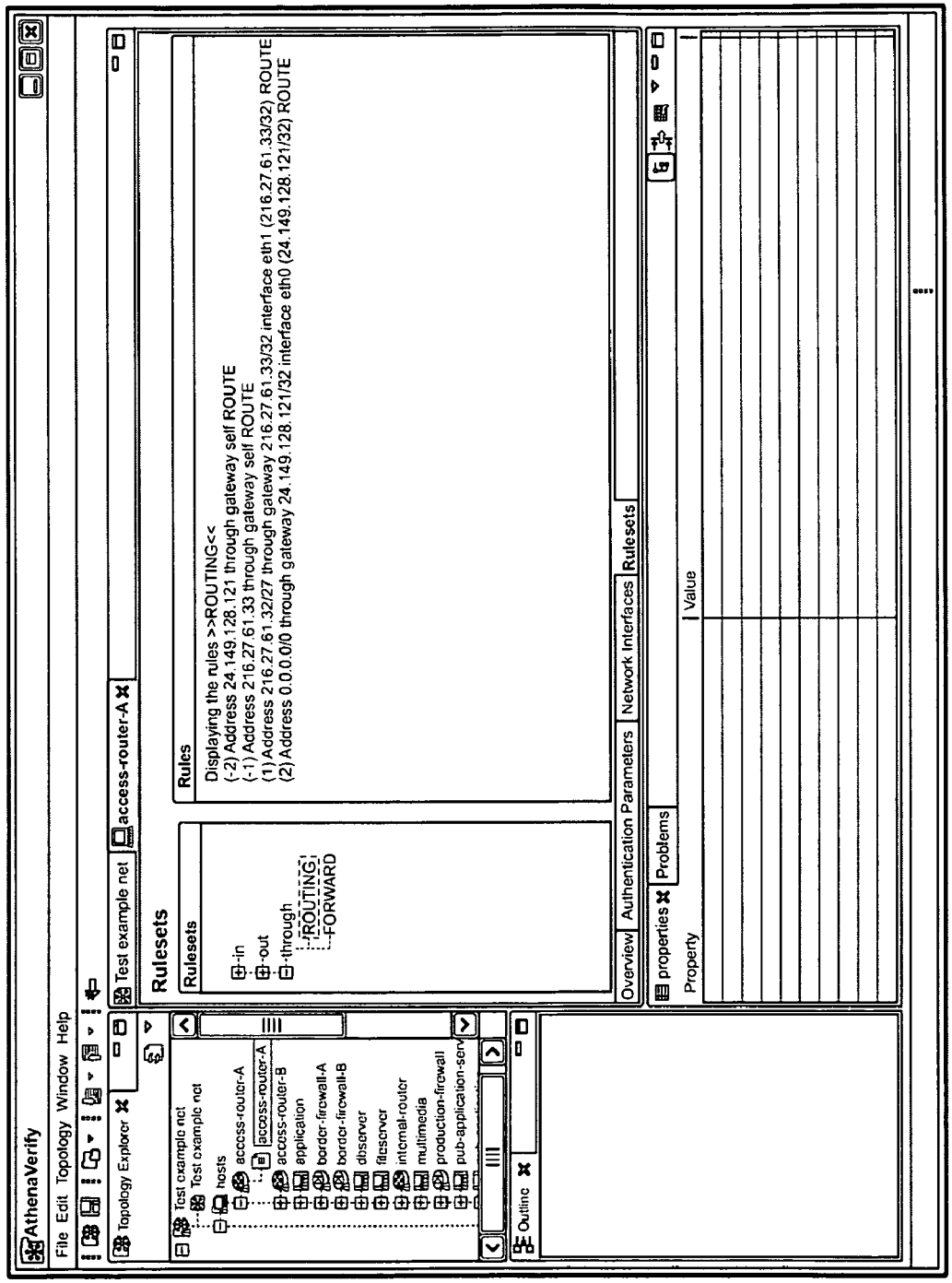

The tree 103 in the first pane 104 includes branches and leaves that represent various devices in the network 10 (FIG. 1). Referring to FIG. 5, if the user selects one of the devices, a "rulesets" tree 109 appears in the second pane 106. The rulesets tree 109 represents the sets of rules that the selected device enforces to admit or deny the passage of network traffic in, out or through the device. The ruleset tree 109 can be expanded. Referring to FIG. 6, for example, the user has selected "access-router A" from the first pane 104. The rules for that router are displayed next to the rulesets tree 109. Note that the router itself may not necessarily express the rules in the same way as they are expressed in the rulesets tree 109. In fact, in an embodiment of the invention, the device adapter for access-router A extracts the rules from access-router A in whatever format access-router A maintains them, and converts them into a canonical ruleset language.

Figure 7:
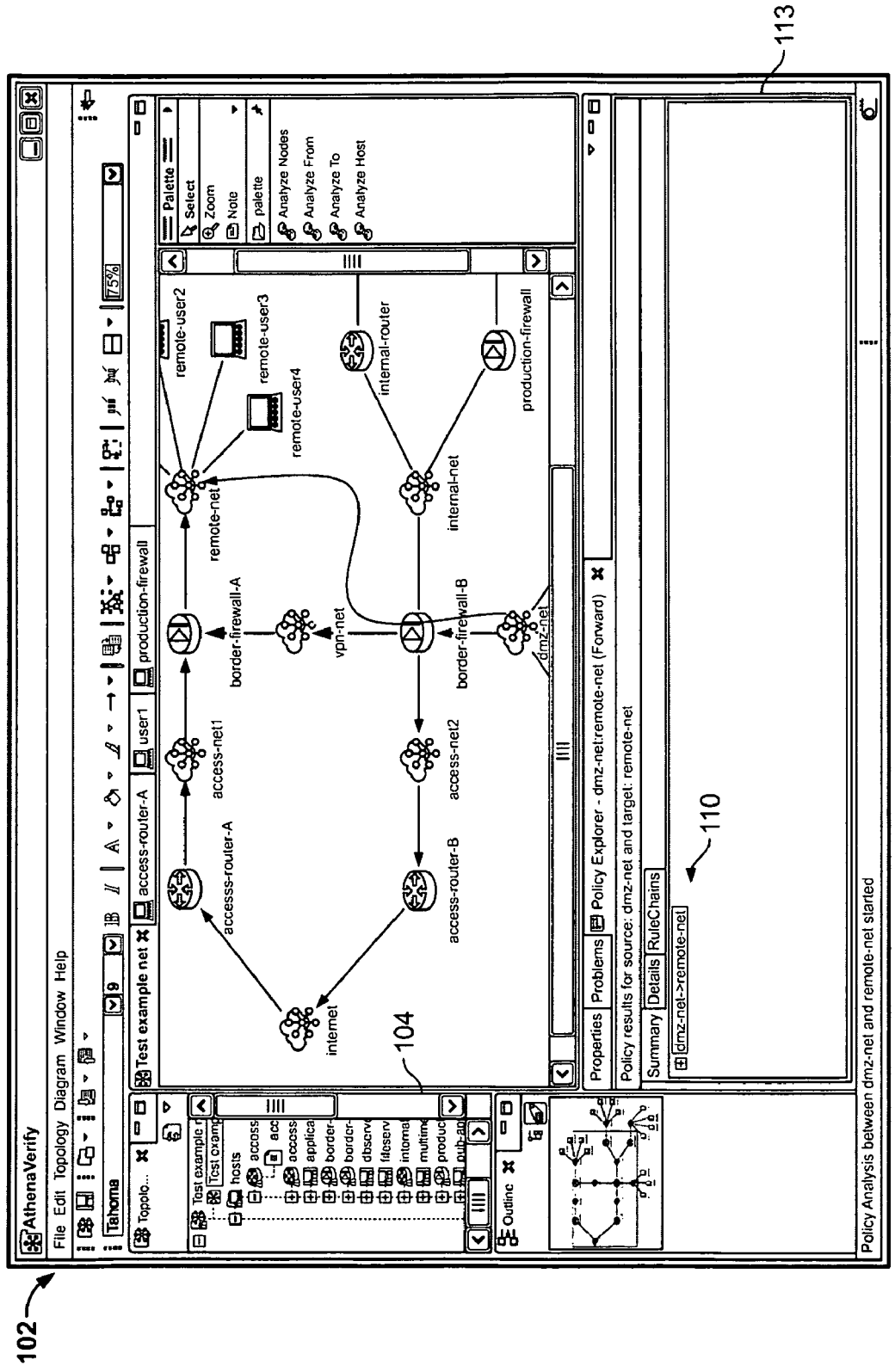
Figure 18:
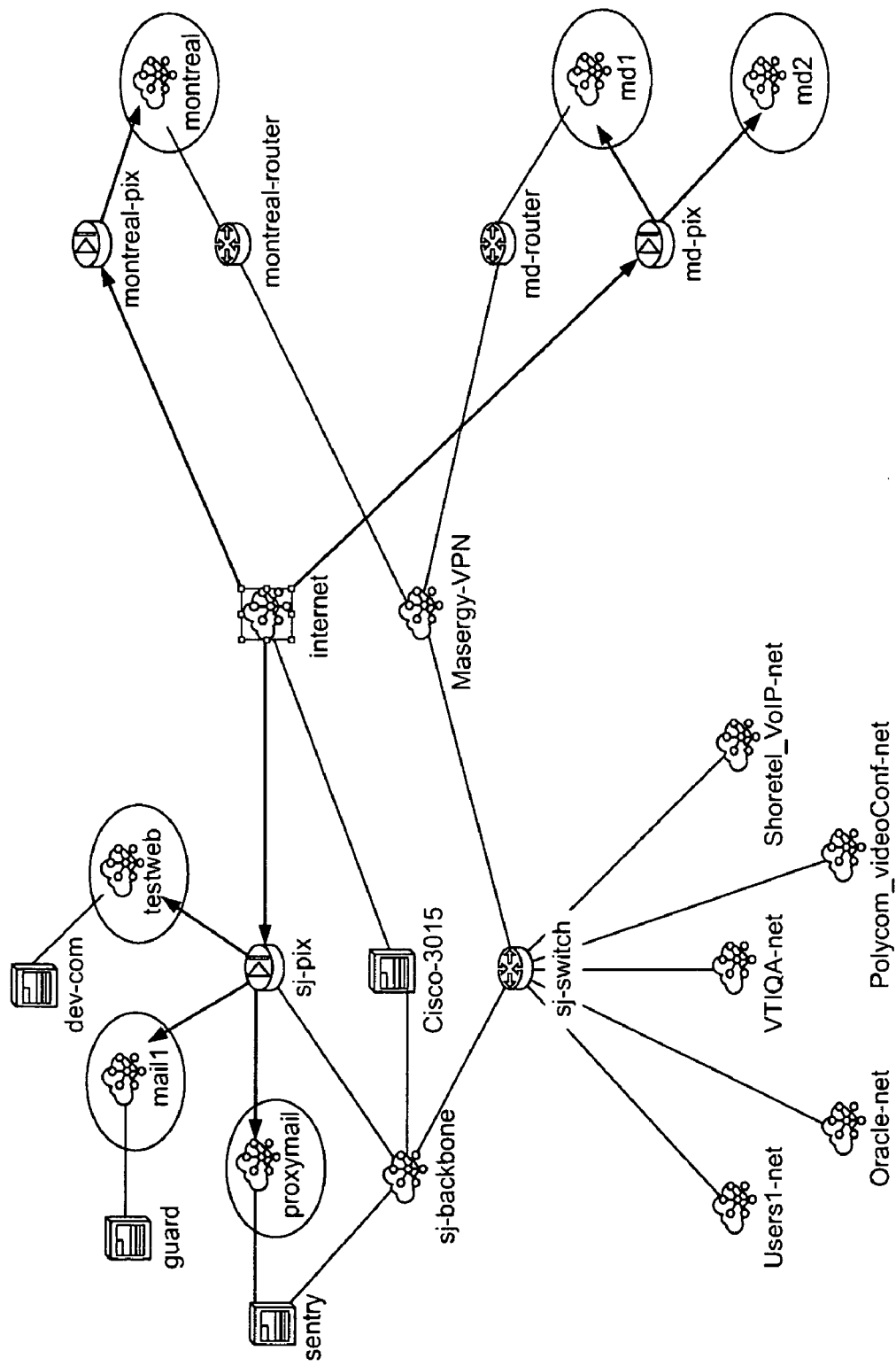
FIG. 18 is a pictorial network diagram illustrating an exemplary network architecture.

Referring to FIG. 7, a user can, in an embodiment of the invention, determine the effective security policy for roundtrip or one way communication between nodes of the network 10—e.g., 1-to-1 nodes, 1-to-n nodes, or n-to-1 nodes. To do so, the user selects one of the two nodes, then clicks, as appropriate, the "Analyze Nodes" button (for 1-to-1), "Analyze from" button (for 1-to-n), or the "Analyze to" button (for n-to-1). An arrow then appears as originating from the selected node or set of nodes. The user then selects the second node or set of nodes. The security analysis program 14 (FIGS. 1 & 2) then calculates the effective policy from the first set of nodes to the second set of nodes. In FIG. 7, the first node is "dmz-net" and the second node is "remote-net." The network diagram (in the second pane 106) displays an arrow (or arrows) from the first set of nodes to the second set of nodes. FIG. 18 shows an example of a 1-to-n selection by the user, in which the user has requested that the effective policy from the internet to several nodes and sub-networks. Such an analysis may be useful when trying to identify vulnerabilities from outside of the network 10 (FIG. 1).

Figure 8:
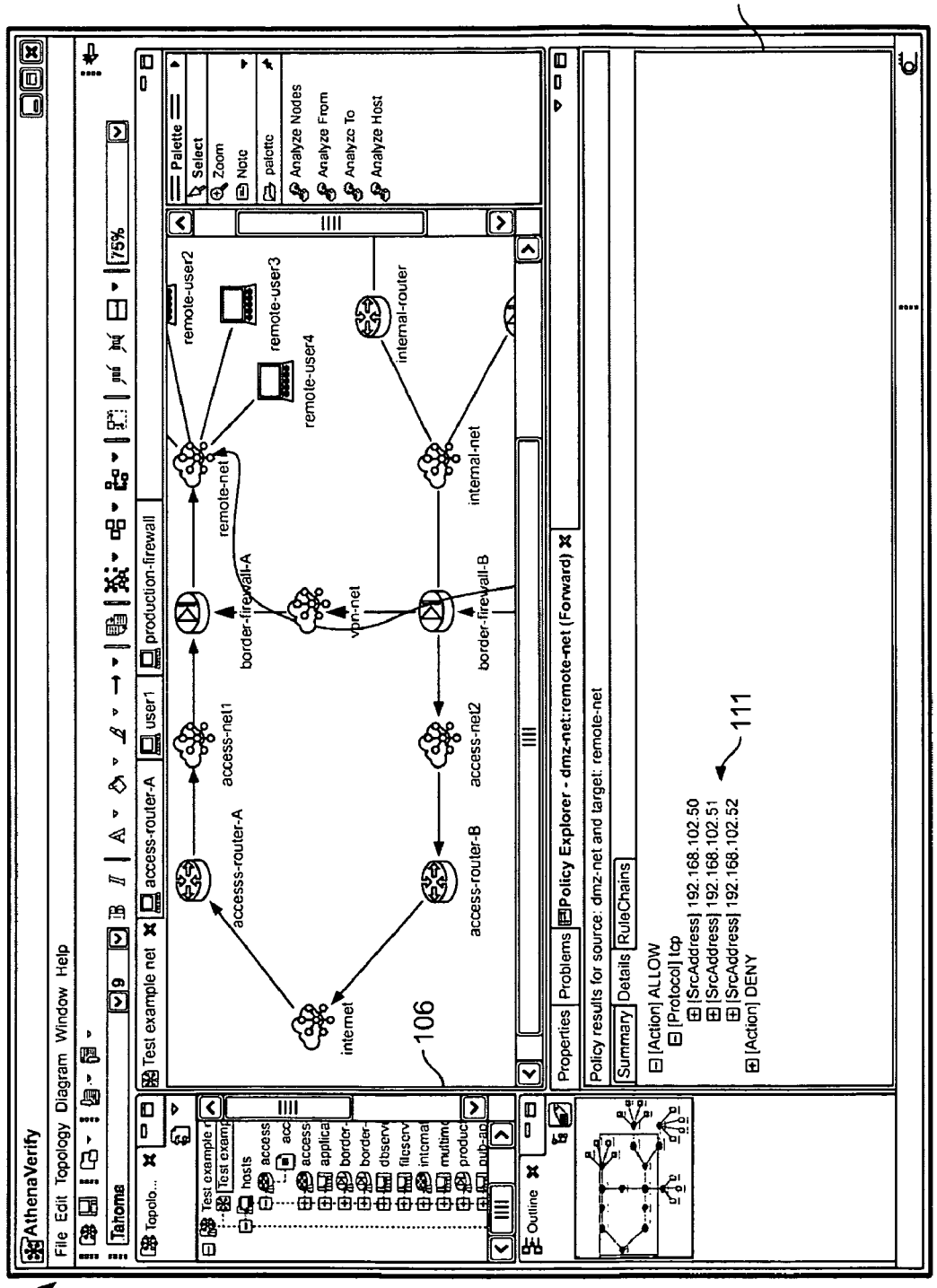

Referring still to FIG. 7, if the user clicks on the "Summary" tab, the security analysis program 14 (FIG. 1) displays a tree 110 representing each of the possible communications paths between the two nodes (or between one node and n nodes) in a fourth pane 113. More specifically, each leaf in the tree represents a path by which at least some network traffic is allowed. Conversely, for each such path, there is a corresponding leaf. The user may then select one of the leaves of the tree 110 and click the "Details" tab. Referring to FIG. 8, the security analysis program 14 responds by displaying details regarding the selected leaf—i.e., details regarding the effective policy for the path represented by the leaf. These details are depicted in a third pane 113 in the form of a policy tree 111. If the user selects a leaf (i.e., a policy) from the policy tree 111 and clicks on the "Rule Chains" tab, the security analysis program 14 (FIG. 2) queries the repository manager 54, which, in turn, queries the device manager 88. The device manager 88 obtains the appropriate rule sets from the device adapter (the via the appropriate device channel 85).

The security analysis program 14 then displays the obtained rule sets in the first pane 120 of the user interface window. The rules are broken down by address range.

Figure 19:
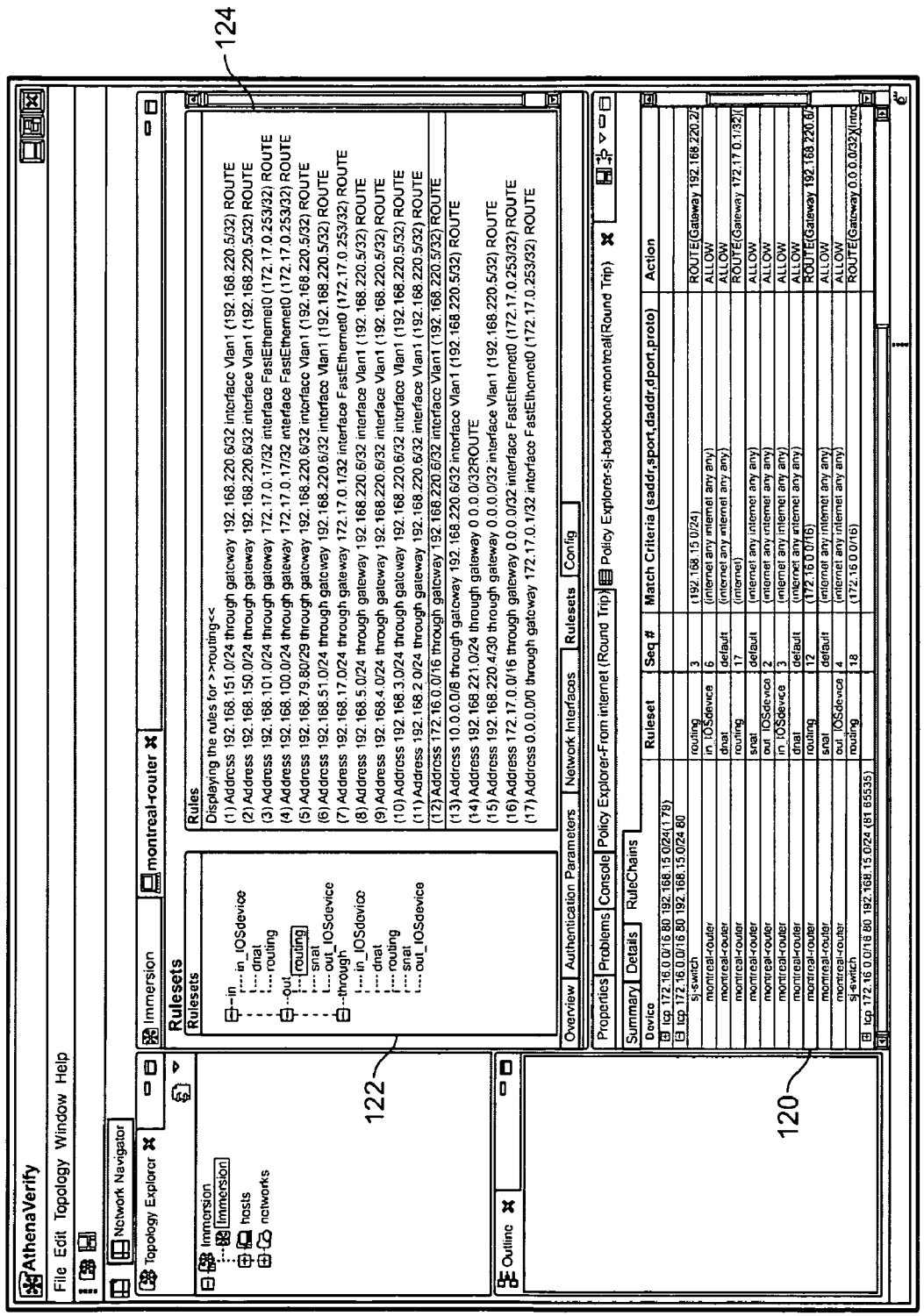
FIGS. 19-20 are computer screen shots illustrating various aspects of a user interface for a security analysis program according to an embodiment of the invention.
Figure 20:
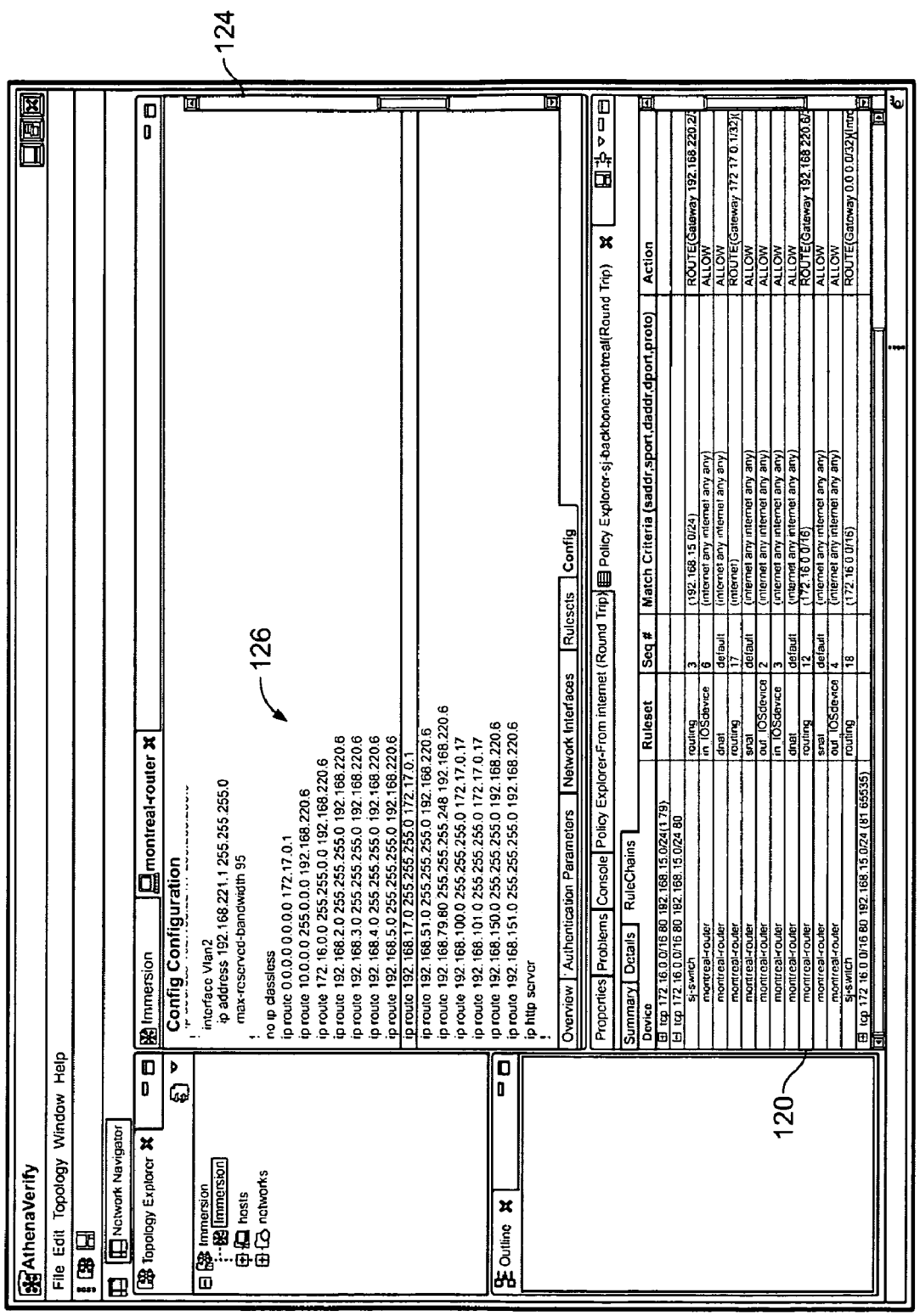

As shown in FIGS. 19 & 20, the user can select one of the rules and, in response, the security analysis program 14 will display the raw settings 126 in a fourth pane 124. The user may then edit the raw settings 126. The user may then edit the raw settings on the user interface. The changes are then transmitted to the device via the device channel. One the device settings have been updated, the user may then rerun an analysis of the various paths of the network 10 to determine what change or changes in the effective policies of the network 10 have occurred as a result of the configuration change.

Figure 9:
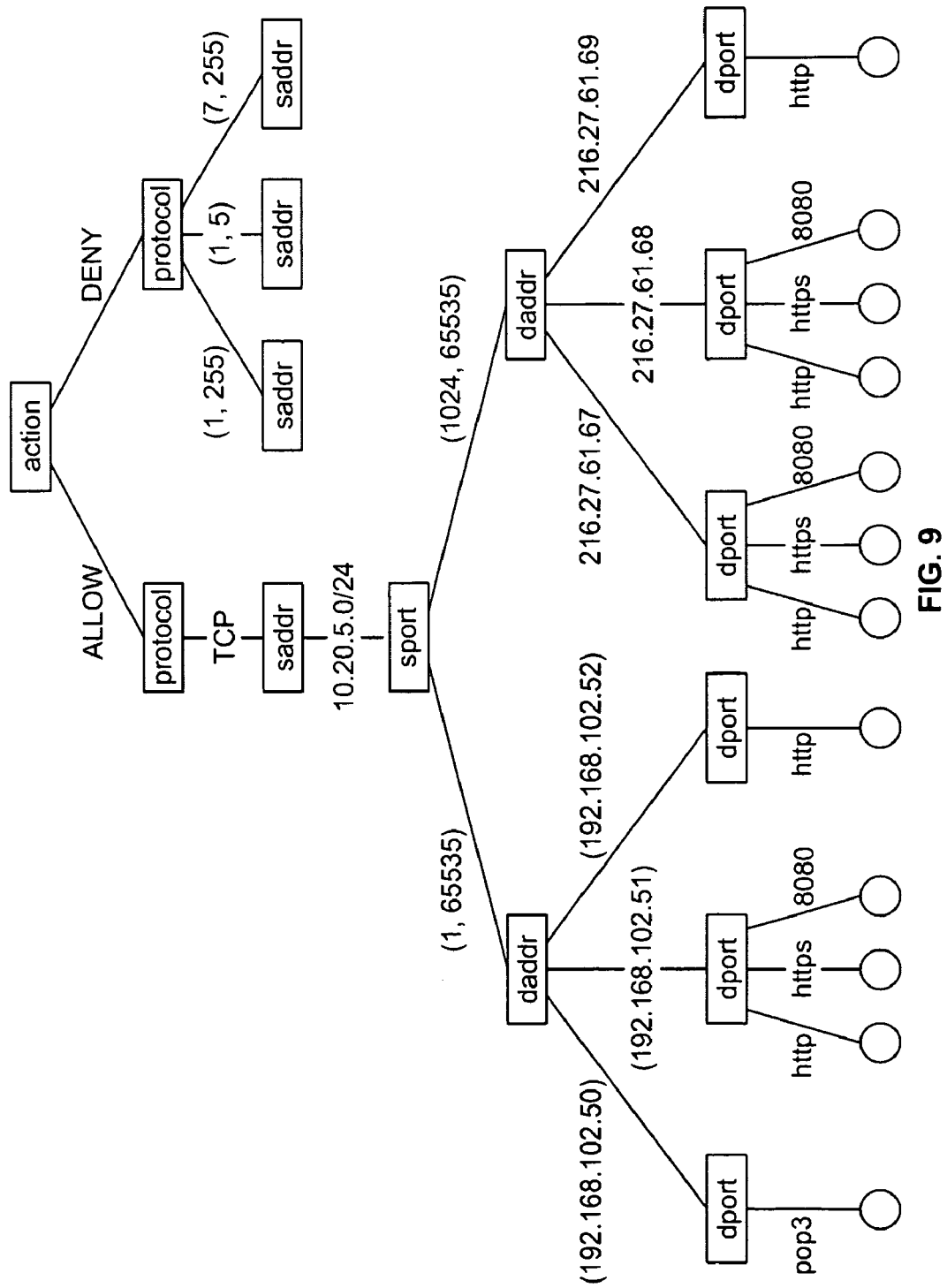
FIG. 9 is a tree diagram illustrating a conceptual view of policy tree according to an embodiment of the invention.

In an embodiment of the invention, the effective policy between two nodes in the network 10 is expressed in terms of five criteria: network protocol, source address, source port, destination address, and destination port. These criteria may be ordered by the user in whatever way the user finds the most useful. The effective policy is then expressed as a tree, whose hierarchy is determined by the order imposed by the user. To illustrate, reference is made to FIG. 9, in which a conceptual view of a policy tree according to an embodiment of the invention is shown. The tree represents a policy between two nodes in which the five criteria are ordered as follows: (1) network protocol, (2) source address, (3) source port, (4) destination address, and (5) destination port.

There are many possible ways in which the security analysis program 14 (FIGS. 1 and 2) can calculate the effective network policy between nodes of a network. The way in which any particular implementation of the invention accomplishes this is based in part on how the devices of the network are modeled. According to one embodiment, each of the devices of the network 10 (FIG. 1) is modeled as described in "A Reference Model for Firewall Technology," by Christoph Schuba, Bryan Lyles, and Eugene Spafford and presented at the SPARTAN Symposium, March 1997, herein incorporated by reference. In this embodiment, however, the reference model is extended to represent security policies of multiple devices on the network 10 as a unitary policy, or, conversely, to decompose a single policy into multiple enforcement functions across the network 10. Extending the reference model across multiple devices in this embodiment is accomplished by determining the "reachability" of nodes in the network 10, as discussed in "On Static Reachability Analysis of IP Networks" by Geoffrey G. Xie, et al. and published in the proceedings of the IEEE Infocom '05 in March 2005, herein incorporated by reference.

Referring to FIG. 10, a text view of a policy tree is shown. As in the conceptual view of FIG. 9, the text view of FIG. 10 has the five criteria ordered by network protocol, source address, source port, destination address and destination port (in that order). Note that destination port ("DstPort" in FIG. 9) can be expressed in terms of a logical port number (such as 8080) or in terms of a service (such as http, which equates to port 80). The text view of the tree is shown in the way it would appear in the user interface 102 (FIG. 3). In this view, the user can quickly look and determine which protocols are permitted, and which source addresses are allowed to receive network traffic for those protocols. But the user may wish instead to focus on which services are permitted for that protocol, and thus may wish to user the following hierarchy in the tree: (1) network protocol ("protocol"), (2) destination port, (3) destination address, (4) source port, and (5) source address. The tree of FIG. 10 would then look like the one shown in FIG. 11.

Figure 12:
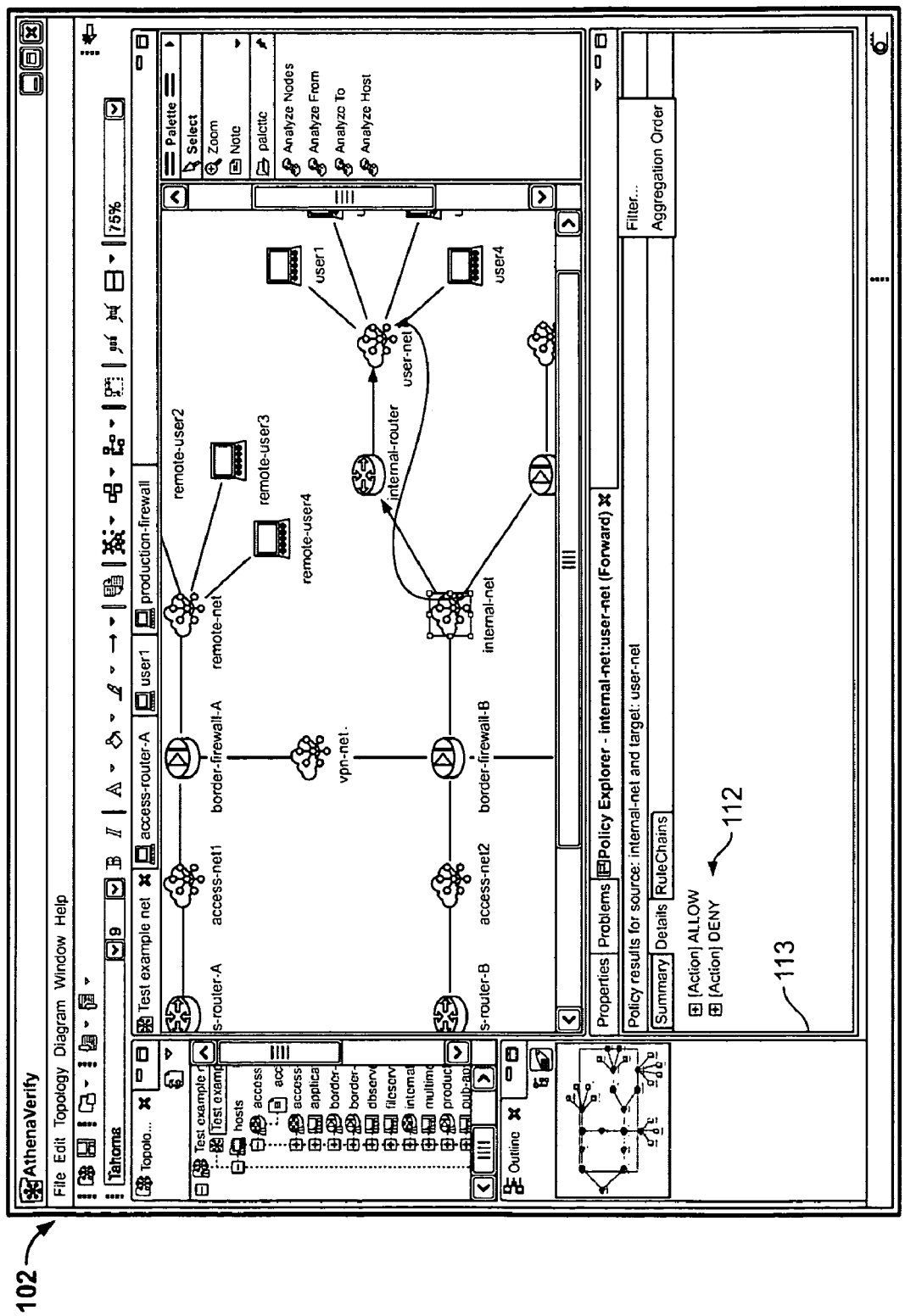
FIGS. 12-17 are computer screen shots illustrating various aspects of a user interface for a security analysis program according to an embodiment of the invention.

Turning to FIG. 12, the user interface 102 is shown once again. In this figure, the "FORWARD" route between "internal-net" and "user-net" has been selected. Furthermore, the effective policy from internal-net to user-net has been calculated by the security analysis program. An expandable policy tree 112 representing this effective policy is shown in the fourth pane 113. Expanding the "ALLOW" branch of the policy tree 112 reveals only packets using the network protocol TCP are allowed to travel from dmz-net to remote-net.

Figure 13:
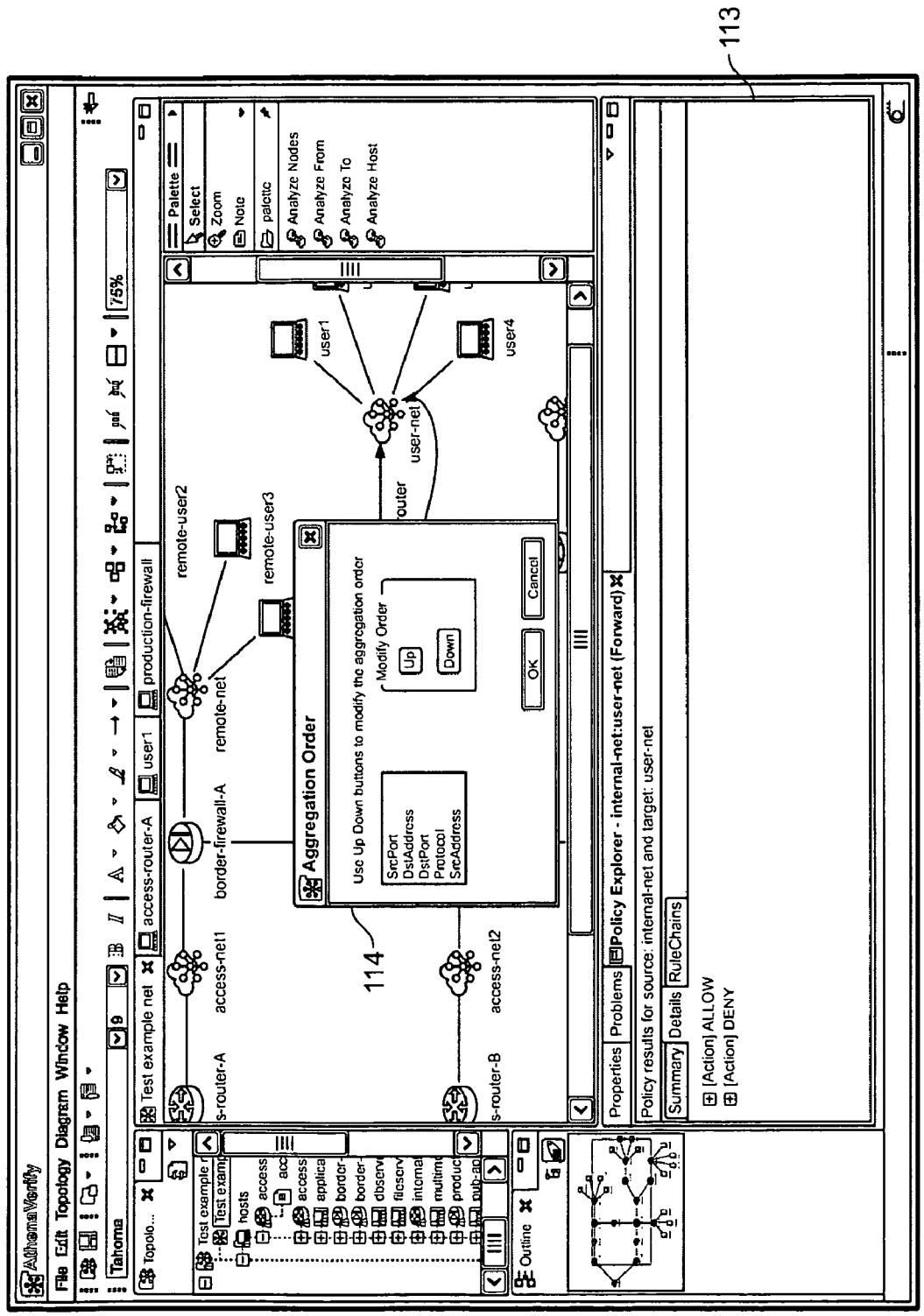
Figure 14:
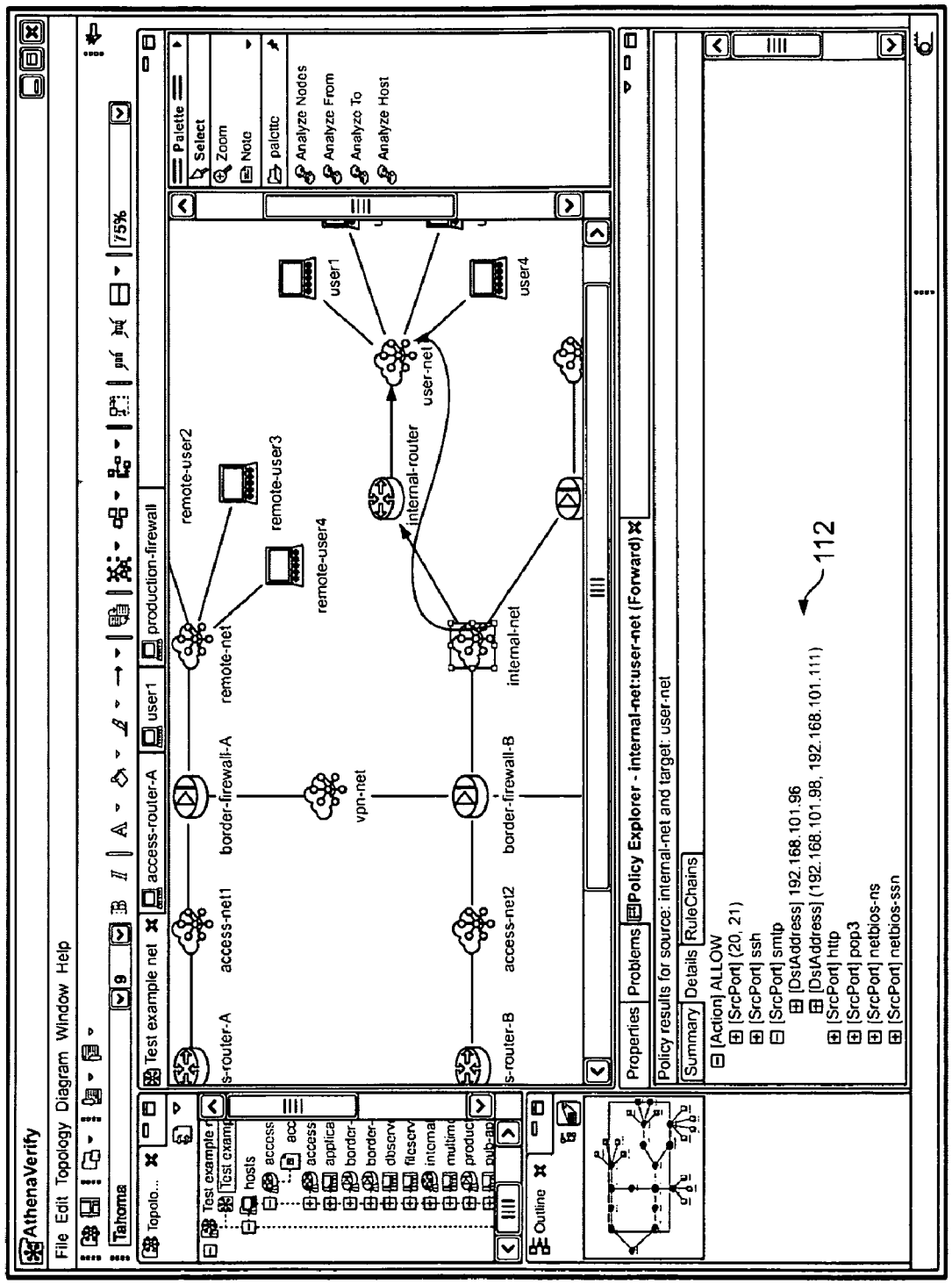
Figure 15:
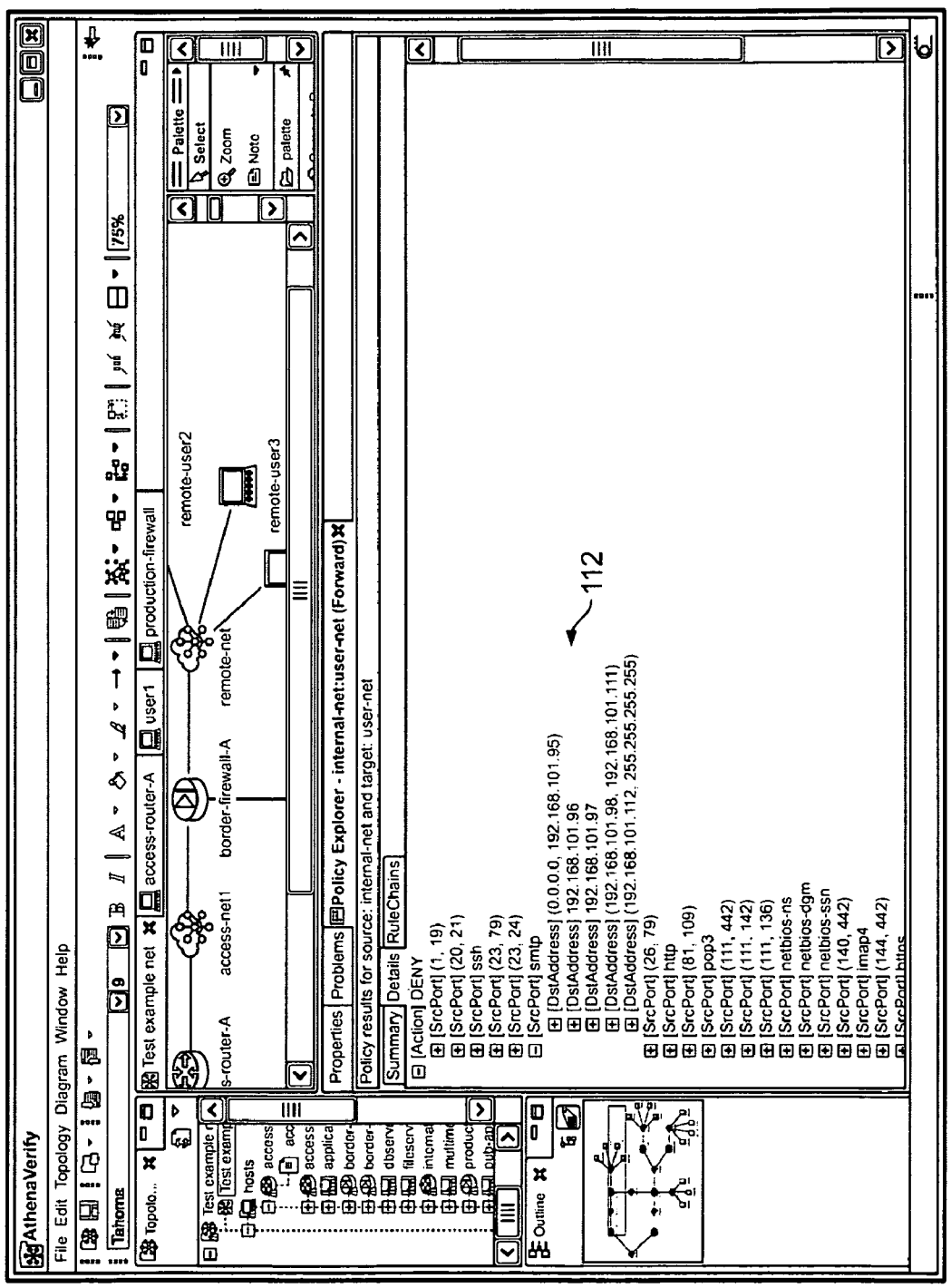

Referring to FIG. 13, an example of how a user reorders the policy criteria will now be described. In this example, the user right-clicks on the fourth pane 113 and selects "Change Aggregation Order" from a pop-up menu. The policy criteria are then displaying in a pop-up window 114. The user may then promote or demote the various criteria. In the example shown in FIG. 12, the user has ordered the policy criteria as follows: (1) source port, (2) destination address, (3) destination port, (4) protocol and (5) source address. An expanded view of the DENY branch of the policy tree 112 after reordering is shown in FIGS. 14 and 15.

Figure 16:
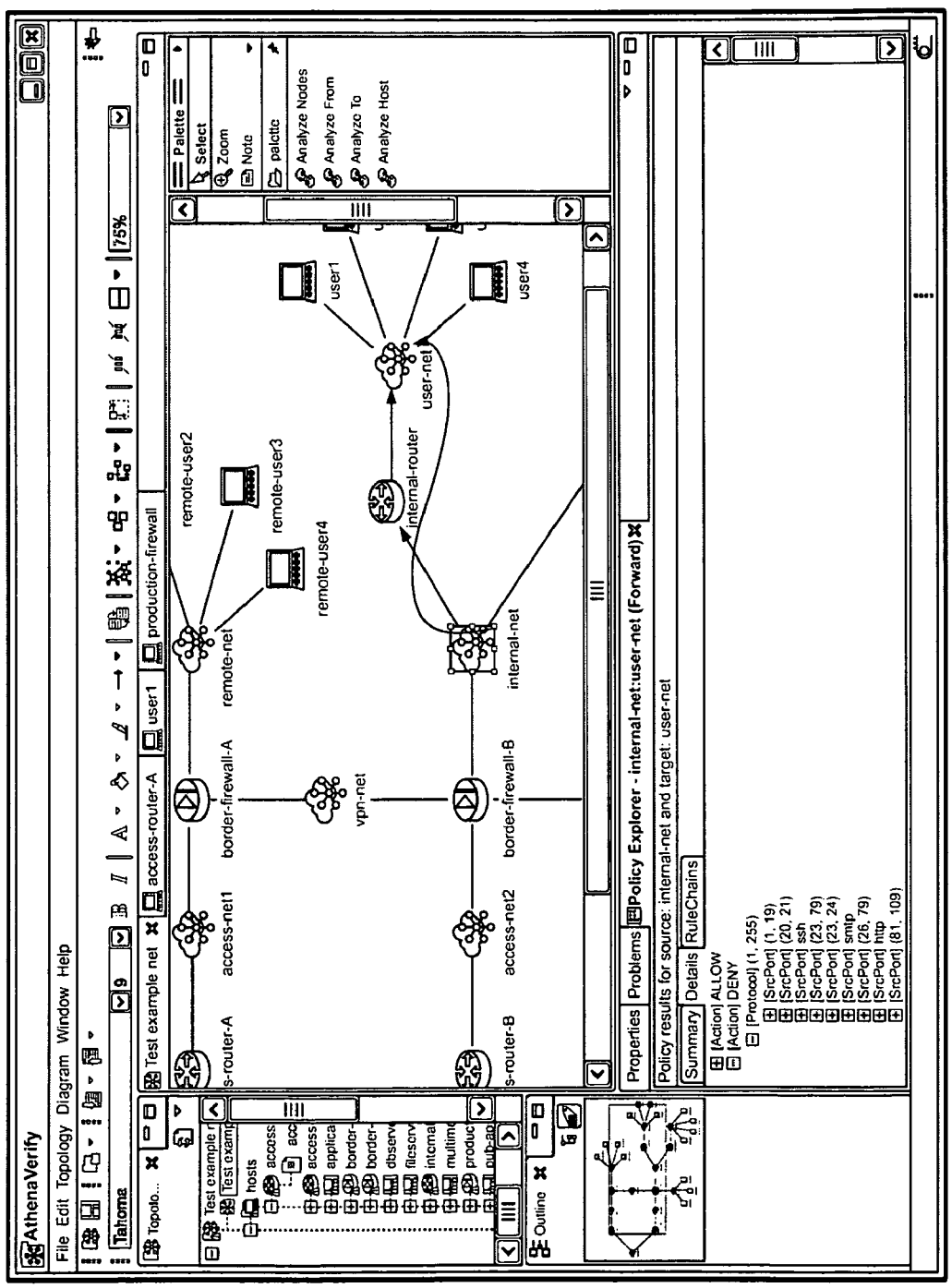
Figure 17:
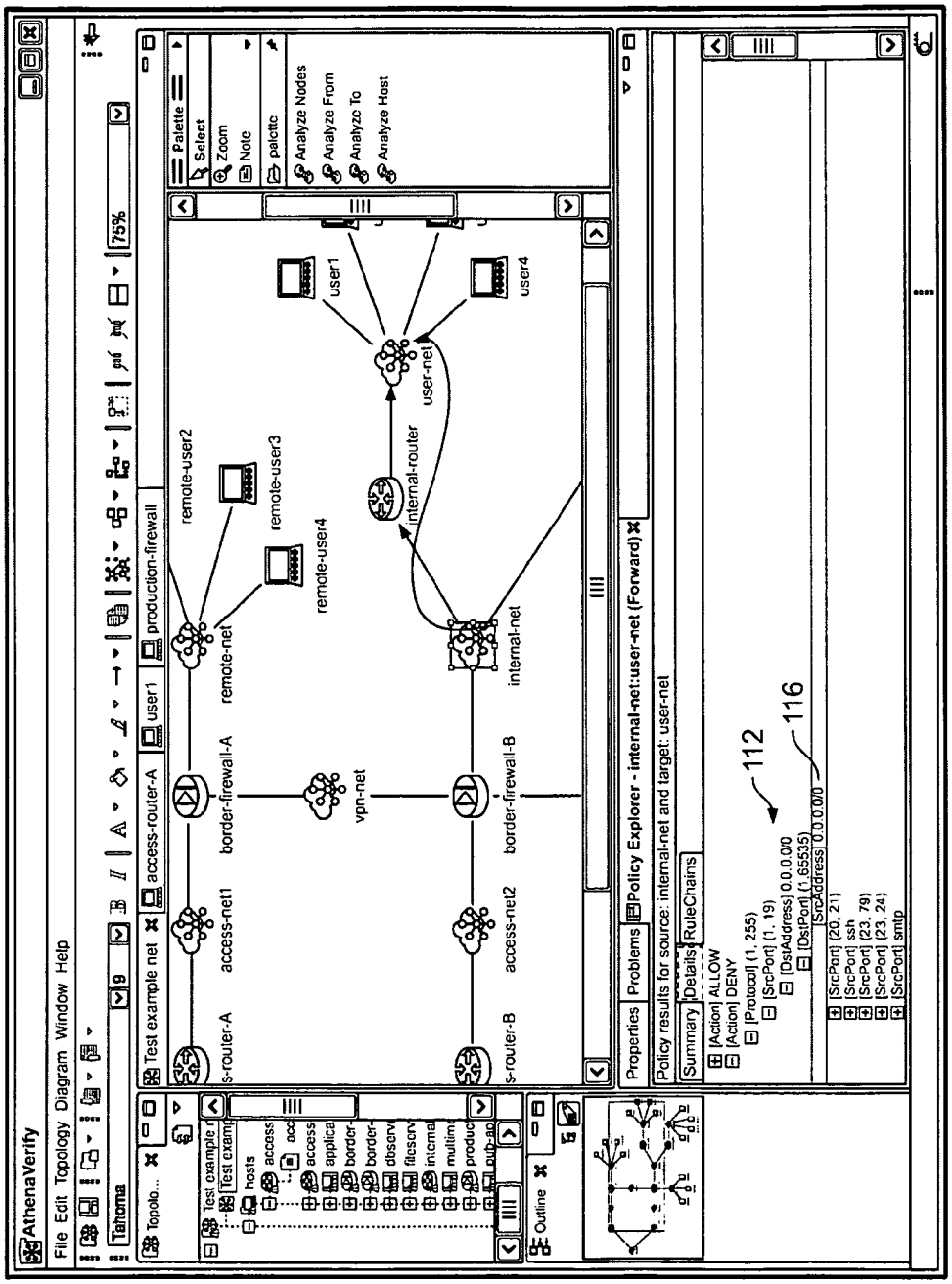

Referring to FIGS. 16 and 17, the policy tree 112 will be discussed in more detail. In FIGS. 16 and 17, the policy criteria are back to the original ordering of FIG. 11, and the DENY branch of the policy tree 112 is shown in the third pane 108. As can be seen in FIG. 16, one of the sub-branches of the DENY branch has been expanded down to a leaf 116. According to this branch, the data traffic that is to be denied includes all protocols (protocols 1 though 255) having a source port of 1 through 19, having a destination address of 0.0.0.0/0 and having a source address of 0.0.0.0/0. A filter may also be applied to the policy tree so as to allow the user to focus on certain aspects of the security policy. The filter may be applied based on any of the five policy criteria. For example, if the user only wishes to know which HTTP requests are being allowed from internal-net to user-net, then the user would apply a filter that showed only those parts of the policy tree that relate to communications whose source port is 80 (the HTTP port).

According to an embodiment of the invention, the security analysis program 14 (FIGS. 1 & 2) keeps track of changes that occur in the effective policy of the network. It does so by using the difference comparator 70 and the policies database 60. The changes can be shown, for example, by displaying a side-by-side comparison of the "old" effective policy with the "new" effective policy, and using underlining, strikethroughs, shading and coloring to indicate which branches or leaves of the policy tree have been added, deleted or changed. Thus, when the topology of the network changes, the resulting changes in the effective security policy of the network are reflected. These changes may then be stored in the policies database 60. Over time, the security analysis 14 compiles an audit trail of the various changes in the network and their impact on the effective security policy of the network.

According to an embodiment of the invention, the security analysis program 14 (FIG. 1) compares the effective security policy of the network 10 to known vulnerabilities stored in the vulnerability rules database 64 (FIG. 2) to conduct a vulnerability analysis of the network 10.

Referring to FIGS. 17-20, another possible feature of the invention will now be described. According to this feature, the user may select, via the user interface, a node or sub-network and, by clicking the "Analyze Host" button, cause the security analysis program 14 to display the security corresponding to the selected host. For example, if the user selects the host "montreal-router" (seen in FIG. 18), the security analysis program 14 (FIG. 2) queries the repository manager 54, which, in turn, queries the device manager 88. The device manager obtains the effective policy from the device adapter representing the host "montreal-router." If the user clicks on the "Summary," "Details," or "Rule Chains" tabs, the security analysis program 14 displays the information described above, except that because only a single device is being analyzed (instead of the effective policy between two or more devices), the policy that gets displayed is simply the policy between each combination of input and output interfaces of the device.

Best Practice Templates

According to an embodiment of the invention, a method and system may be used to measure deviations in a network's architecture, access policies, and device configurations of, the layer-3 devices (e.g. firewalls, routers, layer-3 switches) from a set of "Best Practice Templates" (BPTs) that collectively constitute "good security" in the network infrastructure. The deviations thus measured are used to arrive at an overall risk score. Furthermore, this method and system provide a mechanism for assessing compliance with regulatory and industry standard frameworks (e.g., PCI, HIPAA, GLBA, ISO 27001, CoBIT) where they apply to the network infrastructure.

The following describes: 1) a method for evaluating "Best Practices" on a computer network; 2) a method for evaluating "Network Risk" based on Best Practices; and 3) a method for evaluating compliance to regulatory and industry standard frameworks based on Best Practices.

Figure 21A:
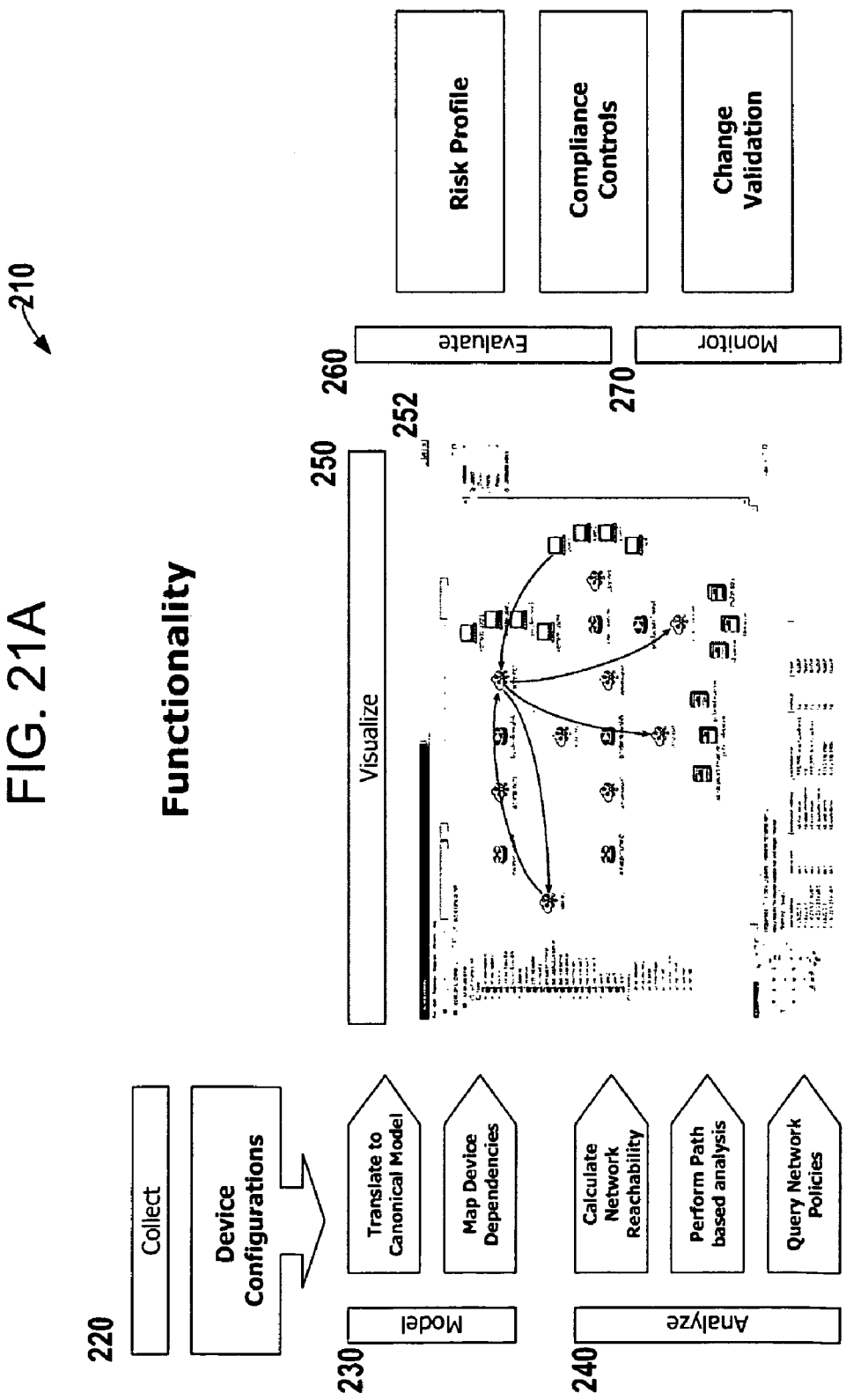
FIG. 21A is a pictorial block diagram illustrating basic functionality.

FIG. 21A illustrates basic functionality of the system 210. In a collect function 220, network device configurations are collected and stored in a non-volatile storage device. These configurations are, in a model function 230 translated into a canonical model and device dependencies are mapped according to relationships between the devices, such as physical and virtual interconnections, network segmentation, etc.

In an analyze function 240, a network reachability is calculated [how?] and a path-based analysis is performed along with a querying of the network policies. Once this is done, a graphic representation of the network is provided in a visualization function 250 on a display 252 of an analysis processor, which may be implemented as a computer having a processor, user input devices, memory, and non-volatile storage. As can be seen in the figure, the various network devices are displayed with lines illustrating interconnections between the devices.

In an evaluate function 260, the risk profile for various Best Practices is determined and an estimation of compliance with various standards and controls is performed. The status of compliance for various network elements and relationships between elements can be indicated by a visual attribute such as color, line thickness, line type (e.g., dotted), etc. on the display 252. Finally, in a monitor function 270, system changes can be detected and validated.

Method for Evaluating Best Practices

The method for evaluating best practices is described below, first by providing a definition of what a Best Practice is, then by defining Best Practice Identification Predicates and Best Practice Evaluation Predicates, and finally by indicating how an example Best Practice Score can be calculated.

Definition of Best Practice

Figure 21B:
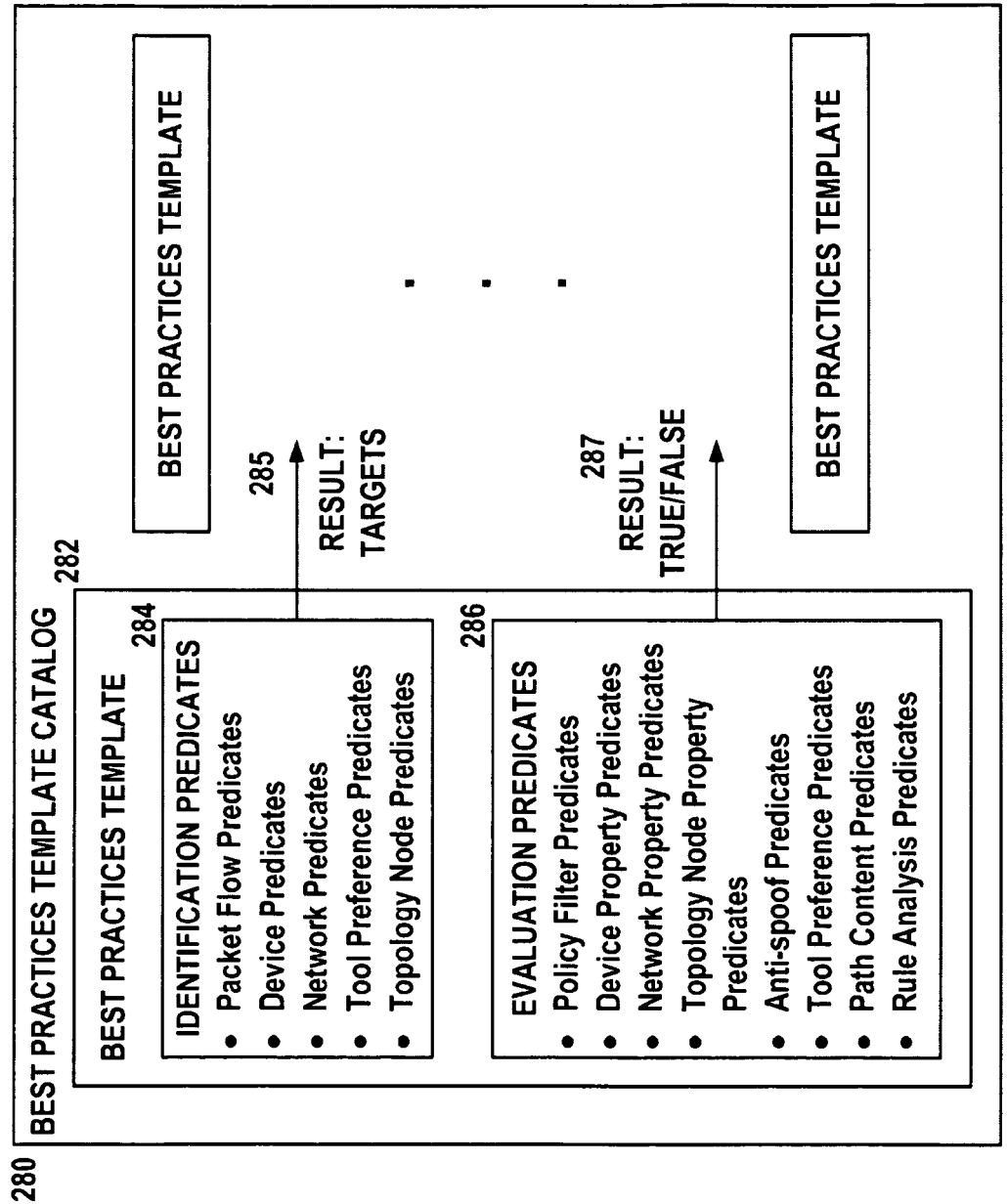
FIG. 21B is a block diagram illustrating an exemplary structure of a Best Practices Catalog.

A Best Practice, as defined herein, and referring to FIG. 21B, is a template 282 that embodies a good design principle that relates to a network's architecture, access policy, or device configuration(s). A Best Practice may be expressed as a Boolean predicate defined over a set of objects and object values that have meaning in the context of a network. The same set of terms need not be present in every Best Practice. As discussed in more detail below, the Best Practice Templates 282 comprise identification predicates 284 that return targets as results 285, and evaluation predicates 286 that return a Boolean value as a result 287. These best practices templates 282 can be arranged collectively into a best practices catalog 280. Examples of comprehensive best practices catalogs can be found in Appendix A and Appendix B. Given the complexity of the rules found in many firewalls, an extensive set of best practice templates are required (Appendix A). A more limited catalog (Appendix B) is provided for other elements of the network.

The filter criteria (via identification predicates 284) that define the objects selected for a Best Practice evaluation includes packet attributes like protocol, source address, source port, destination address, destination port and the filtering actions like ACCEPT/DENY/LOG. The criteria could also include generic expression tests like "number of hosts having management access to firewall should be less than four."

For example, the Best Practice that embodies a design principle involving a "stealth rule" can be stated as, "Deny all packets to or from public networks to the firewall devices." The terms "public networks", "firewall" and "packets" are objects that have specific meanings in the context of the network. The statement as a whole is a Boolean predicate that can be evaluated to a TRUE or FALSE if presented with a specific PUBLIC network, and specific firewall in the network. The evaluation of the Best Practice can be complex, but workable if automated.

The Best Practice can be evaluated as indicated in the following exemplary illustration. First, in a topology graph of the network comprising various types of nodes in the network, compute the paths with the originating node type "PUBLIC" and destination node type "FIREWALL". Then, for each path, determine the policy for the given path and the restricted address range "protocol=any, src addr=any, dst addr=any, src port=any, dst port=any". Next, verify if the DENY space for each compute policy above is equal to the restricted address range above. Finally, the Best Practice is deemed PASS if, for each of the paths, the verification of the DENY space step is satisfied.

In general terms, a Best Practice will have target identification criteria to identify the targets on which a best practice will be evaluated. A best practice should be evaluated on the elements of a network topology i.e., the target of a best practice could be network paths with in the topology, networks in a topology, devices in the topology or topology as a whole.

Target identification criteria specify the criteria to identify these targets. For example, packet flow criteria with a originating, destination attributes to identify the paths with in a topology, network attributes to identify the networks, device type attributes to identify the devices. The targets can be different for different target identification criteria.

A best practice should have target evaluation criteria for each target identification criterion. Each target identified by the identification criterion will be evaluated for best practice compliance using the evaluation criteria defined for it. For example, Policy Packet Filter criteria can be defined on polices computed on Path targets, a Source Access size predicate can be defined on a Policy computed on Path targets (to determine the unique source addresses with in the policy), Property evaluation predicates can be defined on Devices, networks etc., Therefore, best practice evaluation is different for each evaluation criteria and this usually depends on the target being evaluated.

A best practice should have compliance proof for each target that has been evaluated. This would essentially show how each target has been evaluated. For a path evaluated using Policy filter, this would essentially be rule trail; for predicates it is the predicate evaluation. Again the policy compliance proof will be different for different evaluation criteria. But this generally depends on the target.

A best practice should have a compliance result as a whole for the best practice. This may be Pass (all targets complied), Partial (only some targets complied) and Fail (No targets complied).

And of course, the best practice can have other attributes that would be useful for reporting and other purposes.

Figure 21C:
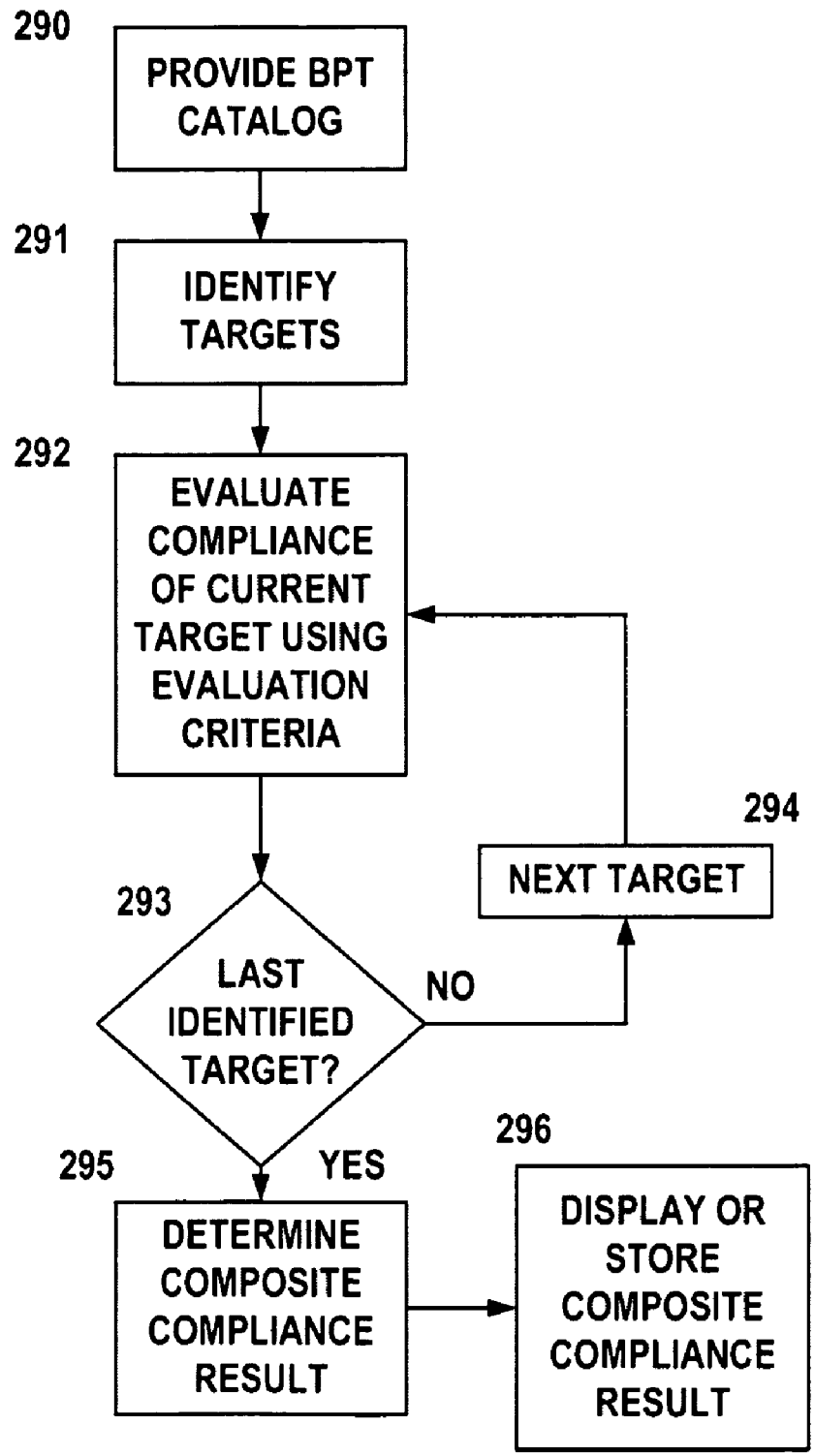
FIG. 21C is a flowchart illustrating method steps according to an embodiment of the invention.

In evaluating a Best Practice, the following steps may be used, as illustrated in FIG. 21C. Once a Best Practice Catalog has been created and provided 290 to the computer system that the evaluation takes place on, The first step is target identification 291. In this step, a target identification criteria is used to identify the targets on which a Best Practice will first be evaluated. The targets of a Best Practice can be network paths in the topology, networks in a topology, devices in the topology, or a structural or functional portion of the topology.

The second step is the evaluation 292 on each target using Evaluation Criteria (within the templates). In this step, each target identified by the target identification criterion is evaluated for Best Practice compliance using the evaluation criteria defined as part of the Best Practice evaluation process. For example, on Path targets, the evaluation criteria may define Policy Packet Filters, and a Source Access size predicate on a Policy computed on Path targets (to determine the unique source addresses with in the policy). These evaluation criteria are different for each Best Practice and can depend on the target being evaluated.

A Best Practice will have compliance proof for each target that has been evaluated. This shows how each target has been evaluated. For evaluations that involve using a Policy Filter, this is a rule trail. For others, it may be a setting in the configuration, or simply recorded or displayed details of the evaluation criteria for that target.

Each target is evaluated, and a test is performed 293 to determine if the last identified target has been reached. If not, the process gets the next target 294 and performs the evaluation 292 with respect to that target.

Finally, once the last target has been reached, a Best Practice will have a composite compliance result determined 295 across all targets evaluated. It is PASS if all targets passed their evaluation criterion, and FAIL if at least one target failed its evaluation criterion. A score indicating the fraction of targets that passed (or failed) is also calculated, and a designation PARTIAL may be provided as well. Once this part is complete, the results of the compliance can be displayed and/or stored for ease of use by the user. The results can be displayed in graphical or textual form.

Firewall Analysis

With regard to firewalls, Appendix A provides a useful set of guidelines for auditing a firewall security policy. Many of the checklist control items ask questions about the firewall behavior such as: Are RFC 1918 and reserved IP addresses blocked as sources? Are insecure network services like HTTP, FTP, Telnet, SNMP, LDAP, Net BIOS, or X11 blocked? Are potentially risky but required services such as HTTPS, SMTP, and DNS isolated in a DMZ?

The order of the rules is significant and a rule early in the ruleset might mitigate or entirely negate the desired effect of a subsequent rule. Changing the order or inserting a rule in an incorrect location could lead to unintended consequences and even unexpected exposure to security threats. It is necessary to verify the IP addresses of sources and destinations that are affected by the rules. Rules that perform network address translation (or NATing) may cause the IP addresses or subnets that are actually permitted or denied to be different from the addresses that appear in the ACL rules. Rulebases that contain alternating allow and deny rules cause complex interactions between the rules.

Components of Firewall Policy

Firewalls from different vendors vary widely in terms of the configuration languages used, the organization of rules and rulesets, and the interactions between different rulesets. These architectural differences must be considered when calculating firewall policy.

Fundamentally, a firewall implements a security policy as a sequence of rules that match for patterns of data in the communication traffic that is to be allowed or denied access into and out of the protected network zones. In general, these rules have the form <P, action>, where P is a predicate describing what packets to match against and action describes an action to perform when the rule matches. The matching predicate specifies a set of values for network sources, destinations, and services that will match. Network sources and destinations are expressed as combinations of individual IP addresses, subnets (specified as IP address and netmask), and ranges of IP addresses. Network services are specified by the combination of protocol (e.g. TCP, ESP, SCTP) and port numbers for both source and destination. Only TCP and UDP use port numbers. ICMP uses type and code values and other protocols (e.g. GRE, ESP) have no additional parameters.

Rules are organized into rulesets. The order of the rules in a ruleset is important because matching proceeds sequentially through the ruleset. Packets not matched continue on to the next rule in the list until a match is found or the end of the ruleset is reached. The first rule to match an incoming packet causes its associated action to be applied. No further matching takes place within that ruleset. If a packet makes it to the end of a ruleset without matching any rules, a default action is applied. Firewalls may have multiple rulesets. Depending on the path through the firewall taken by the packet and the actions applied by matching rules, the packet may traverse multiple rulesets.

As a gateway mediating access between different network zones, a firewall will have network connections to each zone. These connections go through a network interface. Network interfaces may be physical, connecting to a locally attached network, point-to-point, connecting to a single remote host, or virtual, connecting to a VPN. In all cases, the network interfaces represent a different path into or out of the firewall. When calculating a firewall policy, each possible path must be evaluated.

There are several different types of action that may be applied by a rule. Filtering actions determine if the matched packet will be accepted for further processing or simply dropped. Routing actions determine which network interface a packet must pass through to arrive at its destination. Transformation actions modify the source or destination address or service in the packet. The order in which these actions are applied is significant. For example, if a destination address translation rule is applied before the routing rules, a different route rule will likely match the transformed packet than would have matched the untransformed packet. The common actions applied by firewall rules are summarized in the following list:

| | |
|---|---|
| allow | Permit the packet to pass on for further processing. No further matching is performed in the current ruleset. |
| deny | Prohibit the packet from further processing. All processing is abandoned for the packet. |
| route | Select the interface through which the packet must pass in order to leave the firewall. A packet may only ever match one route rule. |
| snat | Transform the source address and/or source port of the packet to a target address and/or port. |

| | |
|---|---|
| dnat | Transform the destination address and/or destination port of the packet to a target address and/or port. |

Identifying Rule Conflicts

The first step to analyzing a firewall policy is to understand the relationships between all of the rules in each ruleset of the configuration. Because rule order matters, the relative ordering and interaction between rules determines the policy that will actually be applied to a given packet. The intention of a specific rule that does match an incoming packet may not be fulfilled as expected because of a prior matching rule with a different action.

The following simple example, taken from a Cisco ASA configuration, illustrates a simple conflict between two rules.

access-list inbound deny tcp any 10.20.1.0 255.255.255.0 eq https access-list inbound permit tcp any host 10.20.1.89 eq https The first rule denies inbound access to HTTPS service for all hosts on the 10.20.1.0/24 subnet. The second rule permits the same HTTPS service to a single host on the same subnet. However, HTTPS traffic will never be allowed to that destination host because it is denied by the first rule, which takes precedence. This is termed a shadowing conflict because the first rule hides or shadows the second rule and prevents the second rule from having any effect. So even though there is an ACL that explicitly permits that HTTPS traffic, the policy actually implemented by the firewall does not.

The preceding example involved only two rules and was pretty easy to spot since the rules were adjacent. Rule conflicts that involve more than two rules can be more difficult to identify, especially when the involved rules are widely separated in the configuration. Consider the following example involving three rules and a service object definition.

object-group service web-svcs tcp
    port-object eq www
    port-object eq https
    access-list inbound permit tcp any host 192.168.23.10 eq www
    access-list inbound permit tcp any host 192.168.23.10 eq https
    access-list inbound deny tcp any host 192.168.23.10 object-group web-svcs The first two rules permit WWW and HTTPS services to a destination host and the third rule denies a service group called web-secs to the same destination. In this case, it is the combination of the first two rules that causes the third rule to be shadowed. As a result, the intention of the third rule to block web services packets to the destination host will not be fulfilled.

In the above examples of shadowed rules, the effect of a rule was completely negated by one or more preceding rules. A more insidious type of rule conflict involves overlaps between the matching ranges of different rules that cause the intended effect of a rule to be only partially fulfilled in unexpected ways. Consider the following example, which attempts to satisfy the requirement in the SANS Firewall Checklist to block inbound packets with (potentially spoofed) private (RFC-1918) IP source addresses.

object-group network rfc1918
    network-object 10.0.0.0 255.0.0.0
    network-object 172.16.0.0 255.240.0.0
    network-object 192.168.0.0 255.255.0.0
    access-list inbound permit icmp any any
    access-list inbound deny ip object-group rfc1918 any A simple review of the ACLs in this configuration would find a rule denying these illegal addresses and might conclude that the SANS requirement to block them was satisfied. The reality is that an entire class of packets with the illegal addresses would be allowed by the preceding rule. This is termed a correlation conflict because the matching range of the ICMP rule allowing packets from any source address intersects with the matching range of the RFC-1918 rule and compromises the intention to block the RFC-1918 addresses.

In general, finding all the rule conflicts in a ruleset requires comparing every rule in the ruleset with every combination of preceding rules in the ruleset and identifying the specific relations that cause rule conflicts. The matching predicate P consists of matching parameters $\{p_i \ldots p_j\}$ that describe source addresses, destination addresses, and services to match. The relation between a matching parameter $p_n$ in rule Rx and the corresponding parameter in another rule $R_y$ can be either equal, subset, superset, or disjoint. For example, the IP addresses 192.168.10.35 and subnet 192.168.12.0/24 are disjoint, but both are a subset (or contained by) of 192.168.8.0/21. There are four types of rule relations to consider.

| | |
|---|---|
| Shadowing | A rule is shadowed when every packet that could match it is matched by some previous rule and the previous rule has a different action. The shadowed rule will never have an effect on policy. |
| Correlation | Two rules are correlated with each rule matches some of the packets matched by the other and they have different actions. The action performed on the traffic that matches the intersection of the two rules is dependent on the ordering of the rules. The subsequent rule will not be able to apply its policy to the packets that match the intersection. |
| Generalization | A rule is a generalization of a previous rule if they have different actions and the subsequent rule matches a superset of all the packets matched by the preceding rule. The preceding rule represents an exception to the policy applied by the following rule. |
| Disjoint | Two rules are disjoint if they match no packets in common Each rule has no effect on the policy applied by the other rule. |

Calculating Firewall Policy

A firewall policy describes the set of packets that will be passed through the firewall, the paths taken by those packets, and any transformations that might be applied to the packets. Individual rule conflicts identify why and where the actual policy applied by the firewall is different than the action of any given individual rule might imply. Calculating the complete firewall policy involves determining the effect of all the rules in aggregate for all sources to all destinations for all services along all paths.

Initially, we will analyze the policy for a single path in the firewall from an ingress interface to an egress interface. Depending on the firewall architecture, one or more rulesets may apply along this path. The policy result for a given path is the aggregate effect of all rules from each ruleset encountered along the path. This is calculated by collecting the matching parameters of each rule and combining them with the policy result from the preceding rules.

The analysis begins with an input set I consisting of all of the packets that might possibly enter the ingress interface. To be complete, the input set must enumerate all packets for every possible source address, every possible destination address, and every possible service. The policy result for the path consists of an allow set $A_{path}$ of packets that can possibly reach the exit interface after encountering the rules from each ruleset along the path and a deny set $D_{path}$ of packets that are blocked from reaching the exit interface. The union of $A_{path}$ and $D_{path}$ is the original input set I.

For the jth rule in a ruleset $<P_j, action_j>$, we define the current state S as $<A_j, D_j>$, where $A_j$ and $D_j$ denote the set of packets accepted and denied before the jth rule. We will use $R_j$ to indicate the collection of remaining packets that could reach the jth rule. Then for the first rule in the path, we have the initial value of $A_1=D_1=\{\ \}$ and $R_1=I$. For each subsequent rule, the current state S is updated by the following state transformation until the end of the path.

$$<P_j, \text{accept}> \Rightarrow\ <A_{j+1}, D_{j+1}> = <A_j \cup (R_j \cap P_j), D_j>$$
$$<P_j, \text{deny}> \Rightarrow\ <A_{j+1}, D_{j+1}> = <A_j, D_j \cup (R_j \cap P_j)>$$
$$R_{j+1} = R_j - (R_j \cap P_j)$$

For an accept rule, the allow set A is updated with the set of remaining packets that matched P. The deny set does not change. For a deny rule, the deny set D is updated with the set of remaining packets that matched P. The allow set does not change. The set of remaining packets R is updated with the packets that did not match P.

At the end of a ruleset a default action is applied to all packets that did not match any rule. Consequently, all packets will either be accepted or denied by the ruleset, so A U D=I. The allow set A from the nth ruleset along the path is used as the input set I for the nth+1 ruleset. The process is repeated for each ruleset along the path until the egress interface is reached.

Example Firewall Policy Analysis

To illustrate how the policy calculation goes, we will use examples from the sample Cisco PIX configuration in Appendix C. This PIX configuration specifies a three-port firewall, connecting an Internal zone, a DMZ zone, and an External zone. The firewall has the following interface configurations.

Interface ethernet0 auto
    interface ethernet1 auto
    Interface ethernet2 auto
    nameif ethernet0 outside security0
    nameif ethernet1 inside security100
    nameif ethernet2 dmz security50
    ip address outside 62.59.14.166 255.255.255.248
    ip address inside 172.16.0.1 255.255.0.0
    ip address dmz 192.168.1.1 255.255.255.0

Consider the path traversing the firewall from the External zone to the DMZ zone. The External zone is connected to the firewall by the outside interface, which has an IP address of 62.59.14.166 and a netmask of 255.255.255.248. Since packets are arriving at the firewall from the Internet, the source addresses for packets in the initial set I can be any IP address. By convention, the notation 0.0.0.0/0 represents the set of all IP addresses.

The packets are subjected to the acl_outside filtering ruleset. This ruleset consists of the following rules (and object group definitions).

object-group service web_svcs tcp
        port-object eq www
        port-object eq https
    object-group service mail_svcs tcp
        port-object eq pop3
        port-object eq imap4
    object-group service inet_svcs tcp
        group-object mail_svcs
        group-object web_svcs
        port-object eq domain
    object-group network dmz_svrs
        network-object host 62.59.14.163
        network-object host 62.59.14.164
    access-list acl_outside deny tcp any 62.59.15.0 255.255.255.0 eq smtp
    access-list acl_outside permit tcp any host 62.59.15.110 eq smtp
    access-list acl_outside permit tcp any object-group dmz_svrs object-group web_svcs
    access-list acl_outside permit tcp any host 62.59.14.165 object-group mail_svcs
    access-list acl_outside permit tcp host 208.121.58.99 host 62.59.14.165 eq smtp
    access-list acl_outside permit tcp host 66.93.145.29 host 62.59.14.165 eq smtp
    access-list acl_outside permit tcp host 67.28.57.31 host 62.59.14.165 eq smtp We will represent a policy result as a set of tuples having five fields containing a single value or range of values for protocol, source address, source port, destination address, destination port. Each tuple represents the set of packets matching the given values and is disjoint from every other tuple. There is no order dependency between the tuples. Applying the policy analysis algorithm described above, the allow set A of the policy result for the acl inside ruleset consists of the following tuples.

( tcp, 0.0.0.0/0, any, 62.59.14.163, http )
    ( tcp, 0.0.0.0/0, any, 62.59.14.164, http )
    ( tcp, 0.0.0.0/0, any, 62.59.14.163, https )
    ( tcp, 0.0.0.0/0, any, 62.59.14.164, https )
    ( tcp, 66.93.145.29, any, 62.59.14.165, smtp )
    ( tcp, 66.93.145.29, any, 62.59.14.165, pop3 )
    ( tcp, 67.28.57.31, any, 62.59.14.165, smtp )
    ( tcp, 67.28.57.31, any, 62.59.14.165, pop3 )
    ( tcp, 0.0.0.0/0, any, 62.59.14.165, imap4 )

Effect of Address Translation and Routing

This result above is only an intermediate calculation and is not the complete policy result for the path from outside to dmz. After the acl_outside ruleset is applied, the policy result set still has to be processed through the network address translations (NATs) to determine how the packets may be modified by the firewall and the routing table to determine what destinations are valid. The following NAT commands from the sample configuration apply to the path we are analyzing.

static (dmz,outside) 62.59.14.163 192.168.1.3 netmask 255.255.255.255 0 0
    static (dmz,outside) 62.59.14.164 192.168.1.4 netmask 255.255.255.255 0 0
    static (dmz,outside) 62.59.14.165 172.16.1.5 netmask 255.255.255.255 0 0

These have the effect of transforming all packets traversing the path with destination addresses of 62.59.14.16{3,4} to 192.168.1.{3,4} and 62.59.14.165 to 172.16.1.5.

The sample firewall has a trivial routing table, with only a default route on the outside interface. In the absence of additional routes, all packets will be forwarded to the outside interface except for those with destinations in the networks locally connected to each interface. The dmz interface provides a local route for the DMZ subnet, 192.168.1.0/24 and the inside interface provides a local route for the Internal subnet, 172.16.0.0/16. Only tuples with a destination address contained by the subnet 192.168.1.0/24 will arrive at the dmz interface and enter the DMZ zone. The following tuples describe the policy result for the path from out side interface to the dmz interface.

( tcp, 0.0.0.0/0, any, 192.168.1.3, http )
( tcp, 0.0.0.0/0, any, 192.168.1.4, http )
( tcp, 0.0.0.0/0, any, 192.168.1.3, https )
( tcp, 0.0.0.0/0, any, 192.168.1.4, https )

Notice that the destination addresses have been replaced by the NAT'ed values 192.168.1.{3,4,5}. The tuples for the mail services (smtp, pop3, imap4) were all removed from the policy result, by the effect of the address transformation and the local route for the Internal zone.

Completing the Firewall Audit Using Policy Results

At the beginning of this paper, we asked several questions of firewall behavior based on recommendations in the SANS Firewall Checklist. In addition to the policy for the path from outside interface to dmz interface, we will also use the policy for the path from outside to internal. This additional policy result is calculated in the method we have described above and contains the following tuples in the allow set.

( tcp, 66.93.145.29, any, 172.16.1.5, smtp )
( tcp, 67.28.57.31, any, 172.16.1.5, smtp )
( tcp, 208.121.58.99, any, 172.16.1.5, smtp )
( tcp, 66.93.145.29, any, 172.16.1.5, pop3 )
( tcp, 67.28.57.31, any, 172.16.1.5, pop3 )
( tcp, 208.121.58.99, any, 172.16.1.5, pop3 )
( tcp, 0.0.0.0/0, any, 172.16.1.5, imap4 )

The checklist questions can now be easily answered using the policy results that we have calculated for the paths from the External zone to the DMZ and Internal zones.

1. Are RFC-1918 and reserved IP addresses blocked as sources? These IP addresses include the following ranges:

| | |
|---|---|
| 10.0.0.0 | to 10.255.255.255 |
| 127.0.0.0 | to 127.255.255.255 |
| 172.16.0.0 | to 172.31.255.255 |
| 192.168.0.0 | to 192.168.255.255 |
| 169.254.0.0 | to 169.254.255.255 |

By inspection, we can see that these addresses are all allowed into the DMZ zone for the web services and into the Internal zone for the IMAP4 service.

2. Are insecure network services like HTTP, FTP, Telnet, SNMP, LDAP, Net BIOS, or X11 blocked? According to the policy result, HTTP is allowed into the DMZ but nowhere else, and all of the other insecure services are not allowed.

3. Are potentially risky but required services such as HTTPS, SMTP, and DNS isolated in a DMZ? The policy result indicates that HTTPS service is only allowed into the DMZ zone, but SMTP is not isolated and is allowed into the Internal zone.

Automating Policy Analysis

As we have seen, these and other questions raised by the Firewall Checklist can easily be answered by calculating the firewall policy and then querying the policy result. The policy result provides accurate answers about how the firewall behaves. Calculating the policy result is can be a very complex process. Even for the small configuration in the sample firewall, the policy analysis must handle the complexities of overlapping rules, network address translations, and routes. In the real world, corporate and enterprise firewalls have rulesets numbering in the thousands of rules, multiple network interfaces, and hundreds of network objects that contain hundreds of individual hosts or subnets, necessitating the use of automated firewall analysis tools.

Figure 22:
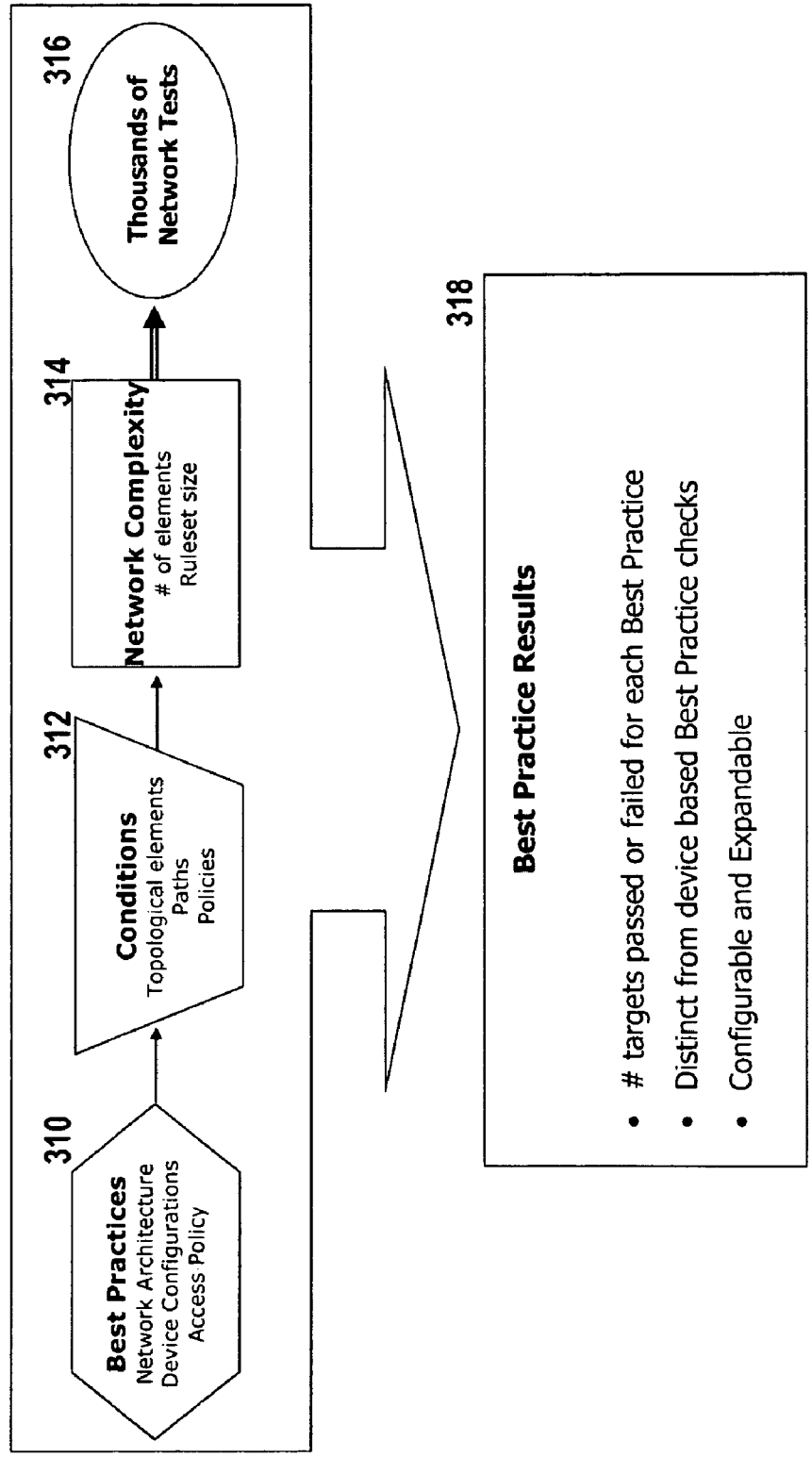
FIG. 22 is a block diagram illustrating the best practice calculation and the results obtained therefrom.

Referring to FIG. 22, evaluating a Best Practice for an entire network involves identifying the Best Practice targets 310 using the Best Practice target identification criteria, evaluating the defined evaluation criteria for each identified target according to the conditions that include topological elements, paths, and policies 312, and take into account the network complexity 314, computing the summary compliance result using the compliance result of each target, and assembling the compliance proofs for each Best Practice target that has been evaluated. This can be done for thousands of network tests 316 and produce best practice results 318.

For the exemplary stealth rule above, the target identification criteria could be a packet flow criteria with origination attribute of "PUBLIC network" and destination attribute of "FIREWALL device". The targets from this criteria would be all paths from a PUBLIC network to a FIREWALL device. The evaluation criteria would be "Deny all services on target path". The evaluation calculates the policy for each target path and applies the above policy filter on the ACCEPT space. The result would be PASS if the filtered policy is empty. The compliance proof, if there is a failure, is the rule trail from the ACCEPT space. However, to show the proof for a PASS, all the DENY space rules are shown that actually implemented the above policy filter.

Best Practice Identification Predicates—Return Identification Results

A number of predicates are provided as Best Practice Identification Predicates, that may include: 1) Packet Flow Predicates; 2) Device Predicates; 3) Network Predicates; 4) Tool Preference Predicates; and 5) Topology Node Predicates. These predicates allow defining criteria for identifying targets to evaluate within the Best Practices, and provide support for the capability to combine smaller predicates into larger expressions using Boolean AND, OR, NOT, NOR, NAND, and any other Boolean logic operators. When combining the predicates to form expressions, the predicates have to be compatible with each other, i.e., identification predicates have to return similar Best Practice targets for combining them.

Identification predicates can be combined using an AND operator to indicate that the targets returned should satisfy all the identification predicates. When using an OR operator, the set of targets is the union of all targets from the criterion within the OR expression. The corresponding NAND and NOR operations could be used as well. Similarly, a NOT operator indicates the set of all targets that do not satisfy the given predicate.

Packet Flow Predicate: This predicate allows identification of the Topology Paths along which certain policy items can be analyzed. This predicate may contain two parameters for identifying Paths, a property/value to identify the topology nodes that could be the originating node of the path, and a property/value to identify the destination nodes for this path. EQUALS and NOT are allowed for the property value check. Other complex Boolean expressions in the origination and destination nodes can be easily implemented.

Example: all paths that originate from "PUBLIC" networks to all networks except "DMZ" (DMZ is an acronym for Demilitarized Zone and represents a computer host or small network inserted as a "neutral zone" between a company's private network and the outside public network. It prevents outside users from getting direct access to a server that has company data). This would essentially bring out all paths from PUBLIC to any network that is NOT DMZ.

Device Predicate: This predicate preferably contains a single parameter to identify the devices using a defined set of properties. Here again multiple predicates can be combined to form expressions, and a list of properties as an implicit AND operation can be supported.

Example: devices specified as "device-model"="Ciscopix" can refer to Cisco PIX devices. There is no restriction on the nature of properties that can be used in the specification; some may be inherent properties such as the Cisco PIX example above, and others may be calculated.

Network Predicate: This returns any network nodes in the topology that one wants to evaluate. This predicate preferably contains a single parameter to identify the networks using a defined set of properties. Here also multiple predicates can be combined to form expressions.

Example: all "DMZ" devices specified as "network-type"="DMZ".

Tool Preference Predicate: This returns any tool preferences defined within a Workspace preference settings. This predicate preferably contains a single parameter to identify the preference, such as by "name".

Topology Node Predicate: This returns any topology nodes in the topology and is used to target nodes that are not networks or network policy devices, such as servers. This predicate can preferably contain a single parameter to identify the topology nodes using a defined set of properties.

Example: all "SERVER" nodes specified as "node-type"="SERVER". It also supports an implicit AND using a list of properties. This predicate is useful when one needs to identify and evaluate topology nodes that are neither networks nor devices.

Best Practice Evaluation Predicates—Return Boolean Results

A number of predicates are provided as Best Practice Evaluation Predicates, that may include: 1) Policy Filter Predicates; 2) Device Property Predicates; 3) Network Property Predicates; 4) Topology Node Property Predicates; 5) Anti-spoof Predicates; 6) Tool Preference Predicates; 7) Path Content Predicates; and 8) Rule Analysis Predicates.

These predicates specify the actual evaluation criteria for the various Best Practice targets to determine the compliance result for the Best Practice. These predicates support the capability to combine the criterion to form expressions using the AND, OR, and NOT operators.

Unlike the Best Practice Identification Predicates that return Best Practice targets, these predicates return a Boolean result. When combining the predicates to form expressions using AND, OR and NOT operators, the Boolean result of each operand within the expression is individually evaluated and then combined appropriately. The various predicates are listed below.

Policy Filter Predicate: This predicate applies to Topology Paths. This predicate specifies the service and action parameters that are going to be used in evaluating the policy computed for the given topology paths. This can default to "deny" action, i.e., what services should not be present in the policy along the specific paths.

Device Property Predicate: This property applies to devices, and this predicate specifies the device properties that indicate features/device behavior that impact the Best Practice. The Device Property predicate evaluates device nodes in the topology graph for specified properties. The predicate specifies what properties should be checked for what values for the evaluation.

Example: to indicate if Denial of Service—Land Attack is enabled for a firewall device, one could check for "dos-guard"="true" and similarly for "prevent-syn-attack"="true".

Network Property Predicate: This predicate applies to networks, and this predicate specifies the network properties that indicate features/network behavior that impact the Best Practice. The Network Property predicate evaluates network nodes in the topology graph for specified predicates. The predicate specifies what properties should be checked with specific values for the evaluation to pass.

Topology Node Property Predicate: Like its Identification Predicate counterpart, this predicate applies to any node within the network topology, and provides a list of properties (implicit AND) that should be evaluated for any topology node. While the Device Property predicate evaluates device nodes in the topology graph for specified properties, and the Network Property predicate evaluates network nodes in the topology graph for specified predicates, the Topology Node Property predicate evaluates properties on any topology node, be it device or network.

Anti-spoof Predicate: This predicate is a custom implementation utilizing properties and values to verify if an anti-spoofing policy has been implemented in every firewall/security device. In some embodiments it may not be configurable, i.e., it has no control parameters that the user can set.

Tool Preference Predicates: These predicates comprise properties permitting looking at the preferences configured with in the software used in the support and maintenance of the network. Some of these might be just checking if a preference is enabled and others might be more involved using library of functions, for example: change notification is enabled, valid and active e-mail addresses are specified for change notification. These predicates may not have any control parameters for the user to specify.

Path Content Predicate(s): These predicates comprise properties permitting evaluation of the content type of the given paths, and may include "Path contains", "Path ends with", "Path starts with".

Examples: 1) a Path contains a Firewall device, Router device, 2) a Path ends with Firewall device and DMZ network nodes, and 3) Paths start with DMZ network and Firewall device. This predicate can be used with a packet flow predicate.

Rule Analysis Predicate(s): These predicates comprise properties permitting evaluation of the rules present in a device. They specify various match criteria and actions that can be matched against the device's rules. The match criteria may include "protocol", "dst addr", "src addr", "dst port", "src port", "ICMP-type", "ICMPcode", and the actions include "accept", "deny", "log", "snat", "dnat", "route", "log". "any" is matched only against "any" for that parameter. Examples of the predicate are: "deny daddr=Device" (stealth rule), and "not allow dport=any" (restrict any inbound service).

Figure 23:
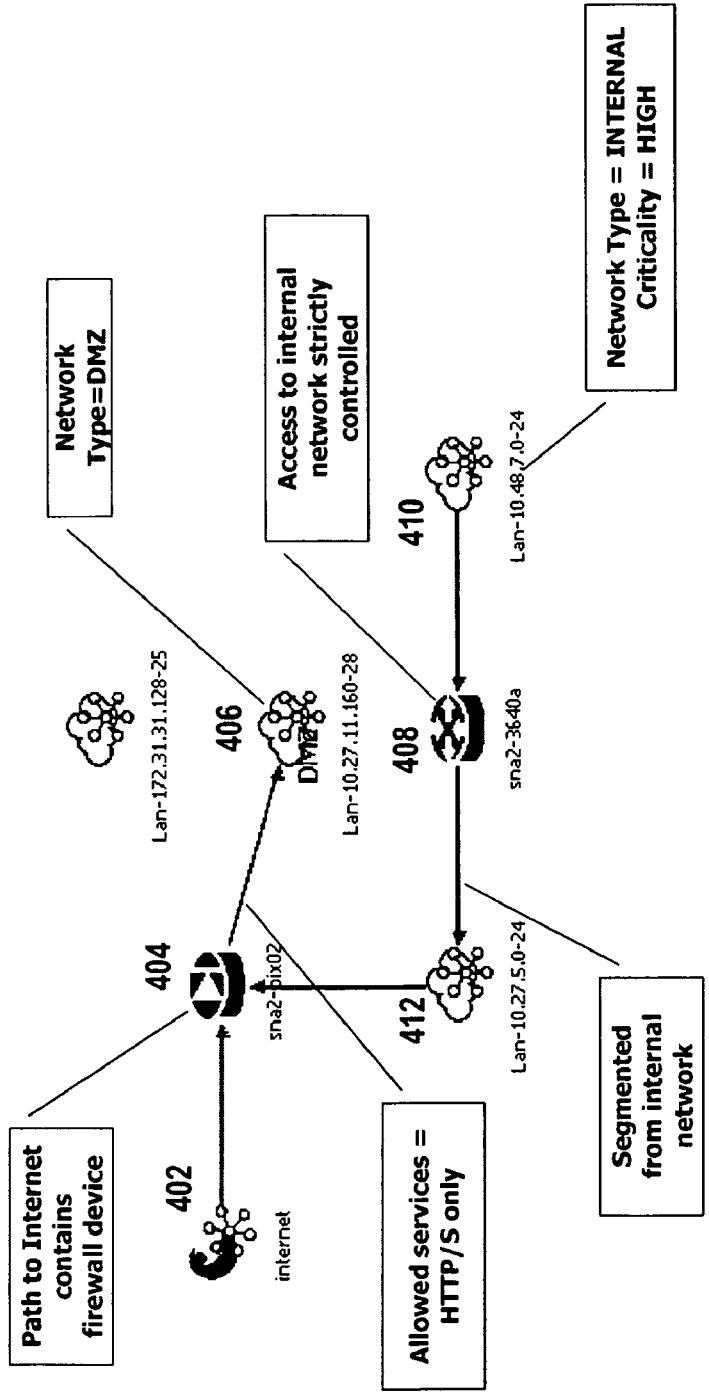
FIG. 23 is a pictorial schematic diagram of a network having various components and a DMZ.

FIG. 23 provides an exemplary illustration 400 of a Best Practice evaluation for isolating Internet servers in a demilitarized zone (DMZ). As illustrated, various network types are connected to the Internet 402 through a firewall device 404. A first network 406 is identified as being of type DMZ, and the only allowed services are HTTP and secure HTTP (HTTPS). An internal network 410 is provided that has a network type=INTERNAL having a HIGH criticality. This is a network containing computers and providing services that require a high level of protection against intruders and other network hazards that might originate externally. A router with packet filtering capability 408 is provided to isolate the internal network and to strictly control access to it. A further network 412 is provided through which the communications from the firewall 404 are provided. The Best Practice would specify that HTTP/S services only be allowed from public networks to designated DMZ networks. Evaluating this Best Practice would find that the path from Internet to DMZ does allow HTTP/S services, while the path from Internet to Internal network does not allow these services.

Calculating Best Practice Score

The Best Practice (BP) score may be calculated in the following manner. The network objects and network paths, or tool preferences to which the Best Practice applies are identified. Each network object and network path or tool preference is then evaluated to determine their compliance with the Best Practice.

A PASS score is assigned to each object and network path that complies with the Best Practice. A FAIL score is assigned to each object and network path that does not comply with the Best Practice. A PASS score is assigned to each tool preference that complies with a Best Practice. A FAIL score is assigned to each tool preference that does not comply with a Best Practice.

A score for each individual Best Practice may be computed, for example, as follows: the number of pass scores divided by the total number of BP evaluations performed for that BP. The BP (total) score can then be computed as the sum of all fractional values obtained for individual BPs divided by the total number of BPs evaluated, times one hundred, and then adjusted to the nearest integer.

Figure 24:
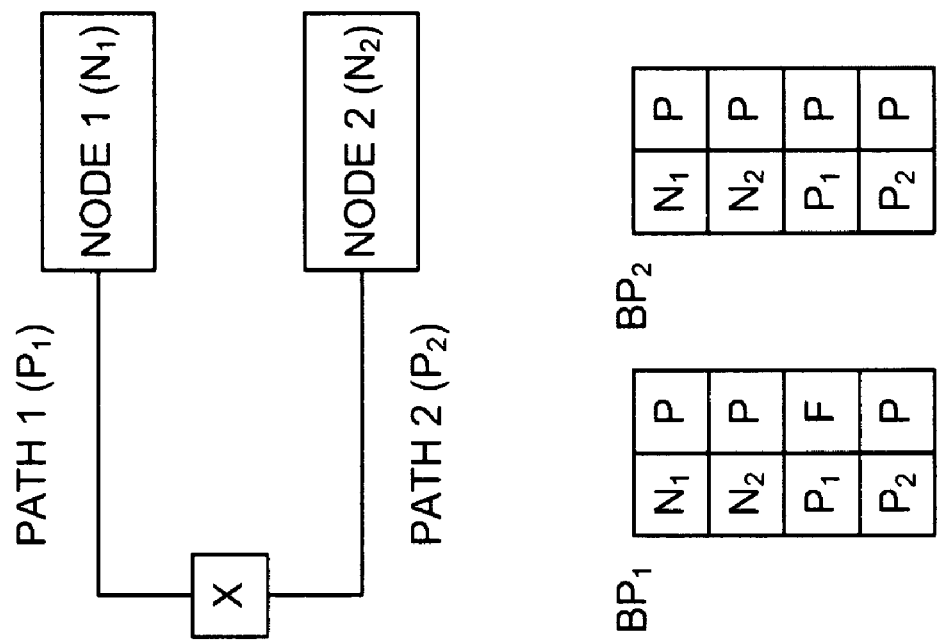
FIG. 24 is a diagram illustrating a simplified example calculation.

Referring to FIG. 24, a specific simplified example is provided, where a network has two nodes (N1, N2), two paths (P1, P2), and two Best Practice templates (BP1, BP2). For the first Best Practice BP1, the evaluation of the four elements (N1, N2, P1, P2) results in three passes and one failure. Based on the above calculations:

$$BP_i = \frac{k_{pass}}{k_{tot}}$$

where:
BPi is the Best Practice score for a particular best practice;
kpass is the number of network paths and objects achieving a pass score; and
ktot is the total number of network paths and objects that the Best Practice applies to.

Here, BP1=¾, or 0.75; and BP2=4/4, or 1.0.

To determine the total Best Practices score, the following is used:

$$BP_{tot} = \frac{\sum_{i=1}^{n} BP_i}{n}$$

where: BPtot is the total Best Practice score; and
n is the number of Best Practice scores.

Here, PBtot=(0.75+1)/2=0.875. A conversion to percentage yields 87.5%, and converting to a representative integer value yields 88.

The algorithms for implementing the calculations may be implemented in software modules that are stored in a memory or computer readable medium and can be run on a processor of general purpose computer, although other implementations are also envisioned.

The determination depends on the calculation of "policy", which involves calculating what services are allowed from all sources to all destinations along all paths (in a topology) or from each entering interface to each exiting interface (for a firewall) by taking into account the effects of the access control rules (ACLs), network address translation rules (NATs), and route rules.

Method for Evaluating Network Risk Based on Best Practices

A network that implements all of the standard Best Practices provides the least risk of attack, while a network that violates Best Practices faces a higher degree of risk.

The risk score can calculated, e.g., as a single value in a range 0-100, where a low score indicates low risk, and a zero score can be achieved if all of the Best Practices that are analyzed obtain a PASS result. The risk score is calculated as 100 minus the Best Practice score.

However, setting a zero minimum score is often not practical for a business enterprise. For this reason, it is likely that each enterprise would set a minimum risk score higher than zero.

Method for Evaluating Compliance with Regulatory Frameworks

Compliance with regulatory frameworks, such as PCI, HIPAA, and GLBA, or with industry standard frameworks (e.g., ISO 27001, CoBIT) is a common requirement for many enterprises. Auditing a complex network for compliance with framework requirements relating to network infrastructure can be difficult and error-prone if it is done manually. The Best Practices method provides a basis for automating compliance verification. Any particular regulatory framework is thus defined as a set of Best Practices that are utilized to determine compliance. For example, the set of Best Practices defining PCI could have certain overlapping Best Practices with the set defining HIPAA, but the set for each regulatory framework could also have Best Practices that are not defined or are different in the other.

Each compliance framework comprises numerous control items that must be verified by an audit check. A significant subset of these control items relate to the network infrastructure. The requirements for these network infrastructure control items are mapped to specific Best Practices that implement corresponding checks. Each control item may map to one or more individual Best Practices.

In order to evaluate compliance with a framework, the set of Best Practices that map to the control items are evaluated following the method described in the above sections. For each control item in the framework, all of the Best Practices must pass successfully in order for that control item to pass. A compliance score may be calculated as the fractional number of control items that passed over the total number of control items, expressed as a percentage.

The values associated with the Best Practice or Degree of Risk scores may be provided to the user on a display of a system used to perform the assessment, and may be further stored on a memory device of the system (e.g., in a data structure such as a table) for subsequent analysis, or communicated via an output of the system.

FIG. 25 provides an exemplary display 500 of the results of the evaluation in the form of Best Practice scores 510. Various categories of Best Practices 520 are broken out, including device configuration, network architecture, and access policy, and an overall score is provided as well. FIG. 5 illustrates the scores as bar charts 530 indicating a percentage of pass items versus overall items. Clearly, any form of visual display could be utilized to illustrate different variations of scores.

Example Implementation of Best Practices

The following list illustrates a set of example Best Practices that could be implemented using the mechanisms described above:

| | |
|---|---|
| Stealth rule | Firewalls should have an explicit rule that denies all connections to the device from outside. |
| Restrict "any" inbound service | Firewalls should not allow inbound connections to any device on an internal network. |
| Restrict "any" outbound connections | Outbound connections from internal hosts should be restricted to only approved services (e.g. HTTP). |
| Protect against "land attack" | Block network packets where the source and destination address are the same. |
| Protect against "SYN attack" | Prevent denial of service attacks using SYN flooding. |
| Restrict access to non-hosted services | Access should be restricted for certain commonly used non-hosted internal services (e.g. netbios, rpc) that are not meant for un-trusted access, to limit potential damage if there is a compromise. |
| Restrict access to hosted internal services | Access should be restricted for certain commonly used internally hosted services (e.g. dns/tcp, dns/udp, http, https, telnet) to limit potential damage if there is a compromise. |
| Segment the network | Public and internal components of the network should be separated by firewall devices. |
| Isolate servers providing Internet services in a DMZ | Servers providing Internet services should be isolated in a DMZ network. |
| Secure firewall management | Access to the firewalls should be over a secure/encrypted protocol (e.g. SSH, HTTPS). |
| No external firewall management | Firewalls should not be managed from external networks. |
| Disable unused interfaces | Unused interfaces should be disabled on all devices. |
| Prevent IP address spoofing | Network packets received by a firewall device that have source IP addresses that are not valid for the networks they originated on should be blocked. |
| Restrict ICMP messages | ICMP traffic should be restricted. Permit specific ICMP requests to public service devices such as web servers. Permit inbound replies, destination unreachable. Deny ICMP redirect, and alternate host addresses. |
| Restrict traceroute | Traceroute (ICMP type 11) should not be allowed from the Internet to the internal network and should be restricted in other cases. |
| Restrict connections from DMZ networks | Systems on DMZ networks should be restricted from initiating connections to the internal/external networks. |
| Restrict connections to DMZ networks | Systems on DMZ networks should only be able to communicate with the outside world through a firewall. DMZ networks must always be segmented from the outside world by a firewall and there should not be any other connections that can bypass the firewall. |

For the purposes of promoting an understanding of the principles of the invention, reference has been made to the various embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The system may use any form of processor and comprise a memory, data storage, and user interface devices, such as a graphical display, keyboard, barcode, mouse, or any other known user input or output device. The system may also be connected to other systems over a network, such as the Internet, and may comprise interfaces for other devices. The software that runs on the system can be stored on a computer-readable media, such as tape, CD-ROM, DVD, or any other known media for program and data storage.

The particular implementations shown and described herein are illustrative examples of the invention and are not intended to otherwise limit the scope of the invention in any way. For the sake of brevity, conventional aspects may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

What is claimed is:

1. A method on a computer for assessing network security in a network topology using best practice templates (BPTs), comprising:
   providing a BPT catalog comprising a plurality of BPTs, wherein each BPT comprises a best practice (BP) that comprises:
   an identification predicate returning identification results over a network related object set having one or more objects and object values, and
   an evaluation predicate returning a Boolean result of TRUE or FALSE or that can be evaluated to PASS or FAIL;
   identifying one or more targets for the assessment using the BP;
   for each target, evaluating compliance of the target using evaluation criteria that are a part of the BP evaluation predicate as PASS or FAIL;
   a processor of the computer determining a composite compliance result across all targets as being PASS if all targets evaluated to PASS; and
   displaying or storing the compliance result.

2. The method according to claim 1, wherein the targets are selected from the group consisting of network paths in the topology, networks in the topology, devices in the topology, other structural portions of the topology, and functional portions of the topology.

3. The method according to claim 1, wherein the identification predicates are selected from the group consisting of packet flow predicates, device predicates, network predicates, tool preference predicates, and topology node predicates.

4. The method according to claim 3, wherein:
   the packet flow predicate comprises two parameters for identifying paths: a property or value to identify topology nodes that could be an originating node of the path, and a property or value to identify a destination nodes for this path;
   the device predicate comprises a single parameter to identify devices using a defined set of properties;
   the network predicate comprises a single parameter to identify networks using a defined set of properties;
   the tool preference predicate comprises a single parameter to identify tools using a defined set of properties; and
   the topology node predicate comprises a single parameter to identify topology nodes using a defined set of properties.

5. The method according to claim 1, wherein the evaluation predicates are selected from the group consisting of policy filter predicates, device property predicates, network property predicates, topology node property predicates, anti-spoof predicates, tool preference predicates, path content predicates, and rule analysis predicates.

6. The method according to claim 5, wherein:
the policy filter predicate specifies service and action parameters that are used in the evaluating for one or more given topology paths;
the device property predicate specifies device properties indicating device features or device behaviors that are checked and associated values for the evaluating step;
the network property predicate specifies network properties indicating network features or network behaviors that are checked and associated values for the evaluating step;
the topology node property predicate specifies a list of properties associated with a topology node that are checked for the evaluating step;
the anti-spoof predicate specifies properties or values relating to firewall and security devices that are checked for the evaluating step;
the tool preference predicate specifies properties that permit looking at preferences configured with in the software used in support and maintenance of the network;
the path content predicate specifies properties permitting evaluation of the content type of the given paths; and
the rule analysis predicate specifies properties permitting evaluation of the rules present in a device, including various match criteria and actions that can be matched against rules of a device.

7. The method according to claim 1, further comprising saving a proof of compliance with the BP for the target.

8. The method according to claim 7, wherein the proof of compliance is selected from the group consisting of a rule trail, a configuration setting, recording details of the evaluation criteria for the target, and displaying details of the evaluation criteria for the target.

9. The method according to claim 7, wherein the determining of the composite compliance further includes determining a score related to a target pass rate.

10. The method according to claim 1, wherein the determining of the composite compliance further comprises:
assembling the compliance proofs into an aggregated compliance proof; and
displaying or storing the aggregated compliance proof.

11. The method according to claim 1, further comprising combining a plurality of compatible predicates into an expression that can be evaluated as true of false, using Boolean logic operators.

12. The method according to claim 1, wherein the composite compliance result is expressed as a percentage of compliances for each target evaluated as a PASS over the total of all targets evaluated.

13. The method according to claim 1, wherein the BPT catalog comprises BPs that ensure compliance to a regulatory framework, the method further comprising:
identifying BPs necessary to comply with the regulatory framework; and
providing an indication of regulatory framework compliance only if all identified BPs necessary to comply with the regulatory framework are met.

14. The method according to claim 13, wherein regulatory framework is selected from the group consisting of PCI, HIPAA, GLBA, ISO27001, and CoBIT.

15. The method according to claim 14, wherein each regulatory framework is associated with a separate set of BPs in a BPT catalog for a particular regulatory framework.

16. The method according to claim 1, wherein the BP further comprises a category designation for the BP.

17. The method according to claim 16, wherein the category designations are selected from the group consisting of device configuration, access policy, and network architecture.

18. The method according to claim 1, wherein the BP further comprises a criticality designation for the BP.

19. The method according to claim 1, wherein displaying the compliance result comprises displaying a graphic indicator on a monitor of a user interface device related to a measure of a degree of compliance.

20. A system for assessing network security in a network topology using BPTs, comprising:
a processor;
a memory for storing algorithms that execute on the processor;
a BPT catalog residing on a storage element of the system comprising a plurality of BPTs, wherein each BPT comprises a best practice (BP) that comprises:
an identification predicate returning identification results over a network related object set having one or more objects and object values, and
an evaluation predicate returning a Boolean result of TRUE or FALSE or that can be evaluated to PASS or FAIL;
an algorithm for identifying one or more targets for the assessment using the BP, and that, for each target, evaluates compliance of the target using evaluation criteria that are a part of the BP evaluation predicate as PASS or FAIL;
an algorithm for determining a composite compliance result across all targets as being PASS if all targets evaluated to PASS; and
at least one of a user interface for displaying the composite compliance result, and a data storage for storing the composite compliance result.

* * * * *